(12) United States Patent
Pierce, Jr.

(10) Patent No.: US 10,221,534 B2
(45) Date of Patent: *Mar. 5, 2019

(54) WAVE SUPPRESSOR AND SEDIMENT COLLECTION SYSTEM

(71) Applicant: Webster Pierce, Jr., Cut Off, LA (US)

(72) Inventor: Webster Pierce, Jr., Cut Off, LA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/851,553

(22) Filed: Dec. 21, 2017

(65) Prior Publication Data

US 2018/0179715 A1 Jun. 28, 2018

Related U.S. Application Data

(63) Continuation of application No. 14/881,032, filed on Oct. 12, 2015, now Pat. No. 9,885,163, which is a
(Continued)

(51) Int. Cl.
*E02B 3/04* (2006.01)
*E02B 3/18* (2006.01)
(Continued)

(52) U.S. Cl.
CPC ................ *E02B 3/18* (2013.01); *E02B 3/04* (2013.01); *E02B 3/06* (2013.01); *E02B 3/08* (2013.01);
(Continued)

(58) Field of Classification Search
CPC ................................................ Y10T 137/402
(Continued)

(56) References Cited

U.S. PATENT DOCUMENTS

| 165,371 A | 7/1875 | Schmolz |
| 1,368,042 A | 2/1921 | Miller |
| (Continued) | | |

FOREIGN PATENT DOCUMENTS

| CN | 1245236 | 2/2000 |
| EP | 0285202 | 10/1988 |
| (Continued) | | |

OTHER PUBLICATIONS

Dictionary Definitions of "Jetty" and "Dam", available at www.thefreedictionary.com (Aug. 18, 2014).
(Continued)

*Primary Examiner* — Sean D Andrish
(74) *Attorney, Agent, or Firm* — Garvey, Smith & Nehrbass, Patent Attorneys, L.L.C.; Julia M. FitzPatrick; Gregory C. Smith

(57) ABSTRACT

A system and method to provide water and sediment flow through a dam or rock jetty, including a plurality of flow pipes positioned through the dam or jetty to receive water carrying sediment and a principal flow pipe to receive flow from the plurality of flow pipes and to deposit water and sediment a predetermined distance to the rear of the dam or jetty. A continuous trough may be mounted on the jetty forward face to efficiently capture water and sediment at entrances of the plurality of flow pipes. A system and method is also provided to suppress wave action against a shoreline and to collect sediment to build up the shoreline, comprising shelves extending out from a front wall of each body section, below a plurality of flow pipes, the shelves for shearing a wave and dispersing and using wave energy to direct sediment through the flow pipes.

19 Claims, 23 Drawing Sheets

Related U.S. Application Data continuation of application No. 13/554,202, filed on Jul. 20, 2012, now Pat. No. 9,157,204, which is a continuation-in-part of application No. 12/576,359, filed on Oct. 9, 2009, now Pat. No. 8,226,325.

(51) Int. Cl.
  *E02B 3/06* (2006.01)
  *E02B 3/08* (2006.01)
  *E02B 7/02* (2006.01)
  *E02B 8/00* (2006.01)

(52) U.S. Cl.
  CPC ................ *E02B 7/02* (2013.01); *E02B 8/00* (2013.01); *Y02A 10/15* (2018.01)

(58) Field of Classification Search
  USPC ........ 405/15, 21, 23, 25, 29, 34, 35, 73, 74, 405/80, 87, 107, 114, 116, 117; 210/162, 210/170.09, 170.1, 170.11; 137/236.1, 137/512.1, 527.8
  See application file for complete search history.

(56) References Cited

U.S. PATENT DOCUMENTS

| | | | |
|---|---|---|---|
| 1,777,491 A * | 10/1930 | Harp | ............... E02B 3/023 37/195 |
| 3,289,417 A | 12/1966 | Girden | |
| 3,373,568 A | 3/1968 | Hornbostel, Jr. | |
| 3,387,458 A | 6/1968 | Jarlan | |
| 3,464,211 A | 9/1969 | Andresen | |
| 3,632,508 A | 1/1972 | Girden | |
| 4,184,786 A | 1/1980 | Richards | |
| 4,367,978 A | 1/1983 | Schaaf et al. | |
| 4,448,571 A | 5/1984 | Eckels | |
| 4,479,740 A | 10/1984 | Schaaf et al. | |
| 4,502,816 A | 3/1985 | Creter, Jr. et al. | |
| 4,708,521 A | 11/1987 | Kocourek | |
| 4,711,598 A | 12/1987 | Schaaf et al. | |
| 4,978,247 A | 12/1990 | Lenson | |
| 5,022,784 A | 6/1991 | DeVries et al. | |
| 5,150,988 A | 9/1992 | Powell et al. | |
| 5,393,169 A | 2/1995 | Creter | |
| 5,439,316 A | 8/1995 | Richardson | |
| 5,489,165 A | 2/1996 | Smith | |
| 5,895,174 A | 4/1999 | Beaver | |
| 6,561,730 B2 | 5/2003 | Yang | |
| 6,955,759 B2 | 10/2005 | Patrick et al. | |
| 7,029,200 B1 | 4/2006 | Cravens | |
| 7,165,912 B2 | 1/2007 | Herzog | |
| 7,507,056 B2 | 3/2009 | Spry | |
| 7,708,494 B2 | 5/2010 | McLaughlin | |
| 8,226,325 B1 | 7/2012 | Pierce, Jr. | |
| 8,985,896 B2 | 3/2015 | Pierce, Jr. | |
| 9,157,204 B2 | 10/2015 | Pierce, Jr. | |
| 9,885,163 B2 | 2/2018 | Pierce, Jr. | |
| 2002/0012571 A1 | 1/2002 | Nichols | |
| 2005/0123352 A1 | 6/2005 | Peyton | |
| 2006/0056913 A1 | 3/2006 | Herzog | |
| 2006/0104719 A1 | 5/2006 | Fainman et al. | |
| 2009/0148243 A1 | 6/2009 | McGinn et al. | |
| 2009/0154996 A1 | 6/2009 | Liner | |
| 2015/0259868 A1 | 9/2015 | Pierce, Jr. | |

FOREIGN PATENT DOCUMENTS

| | | |
|---|---|---|
| GB | 1492624 | 11/1977 |
| JP | 01036811 | 2/1989 |
| KR | 20070038196 | 4/2007 |
| RU | 2373328 | 11/2009 |
| WO | WO8909308 | 10/1989 |

OTHER PUBLICATIONS

International Preliminary Report on Patentability for International Patent Application Serial No. PCT/US2010/052182, dated Apr. 11, 2012.

* cited by examiner

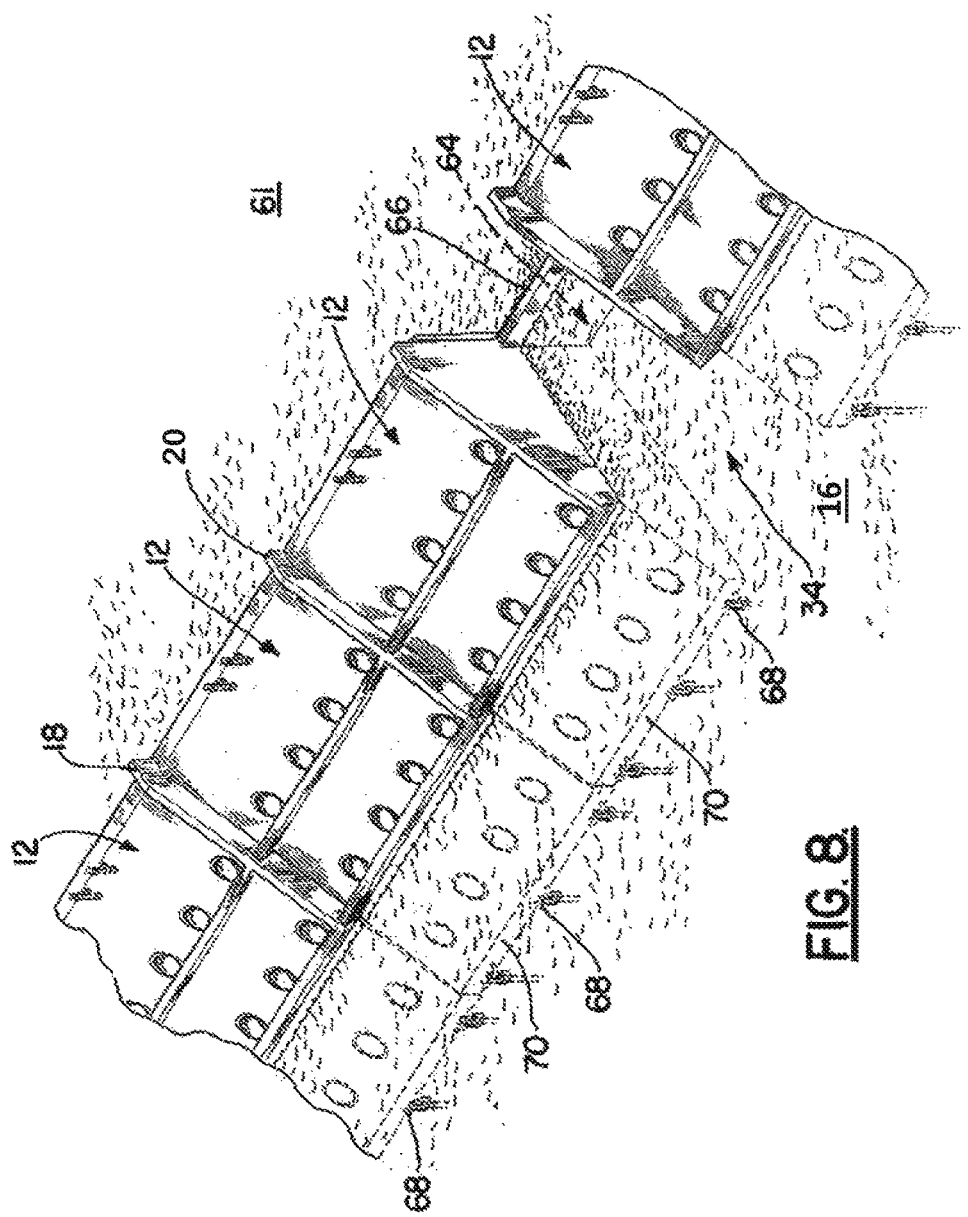
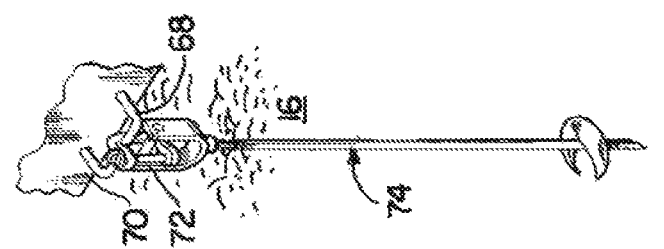

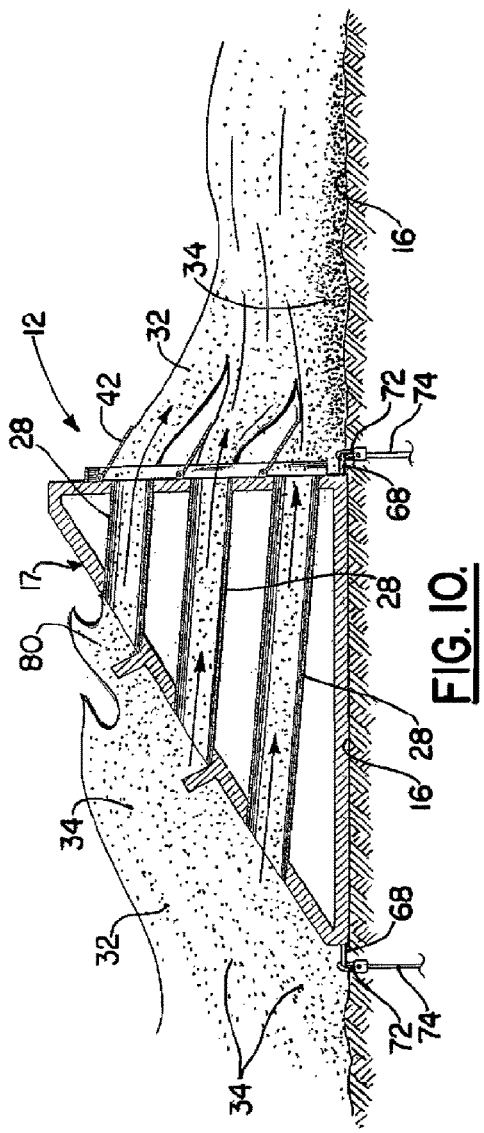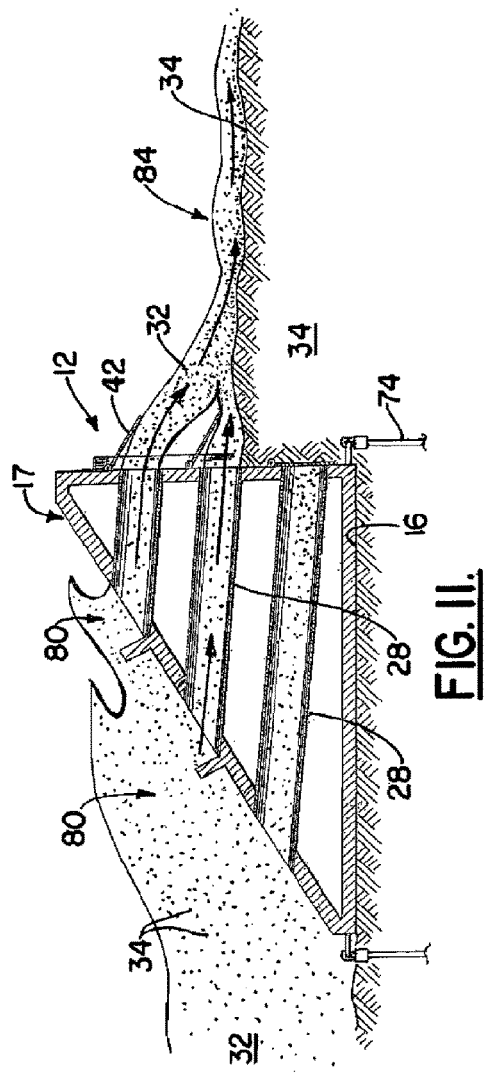

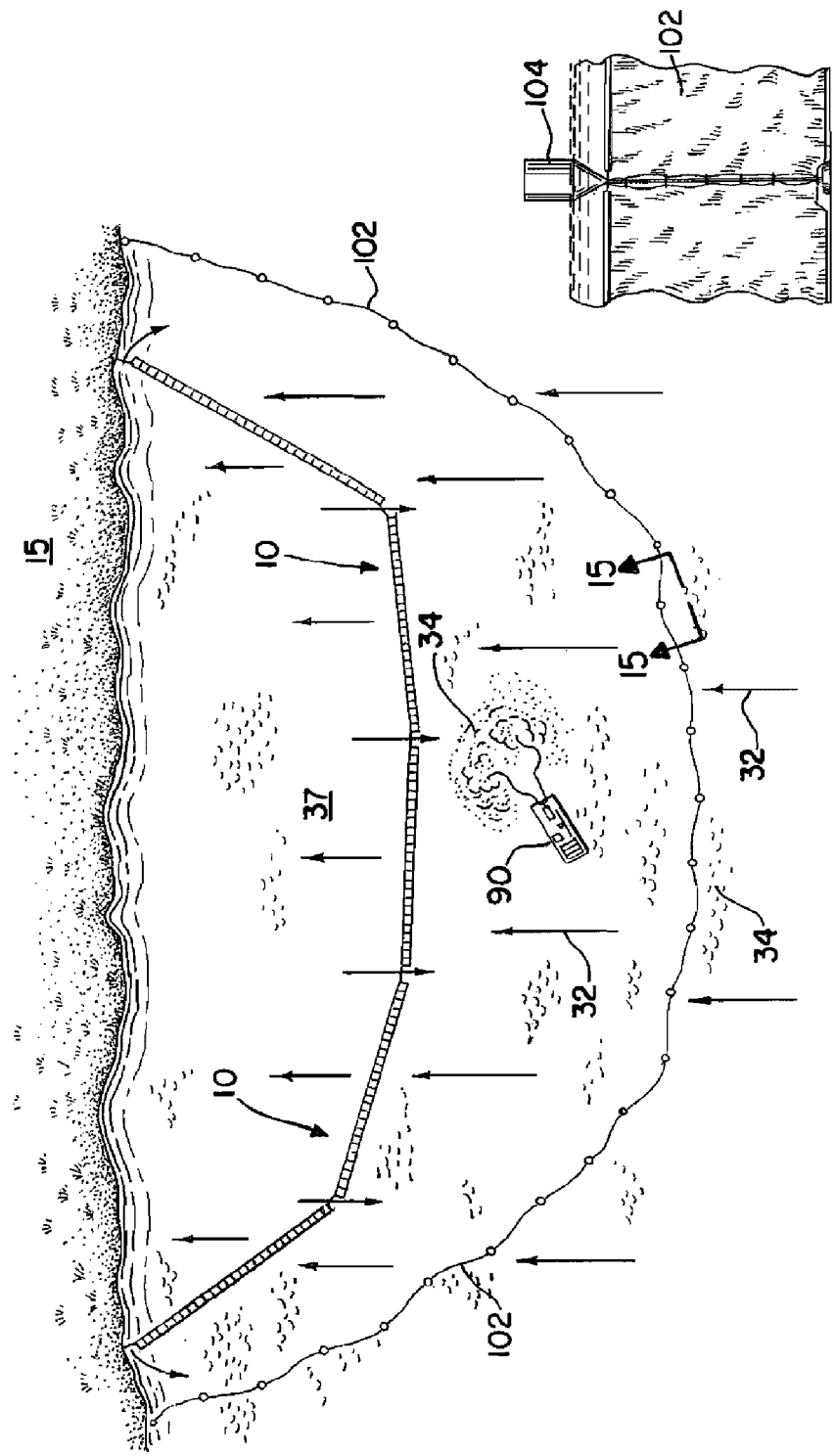
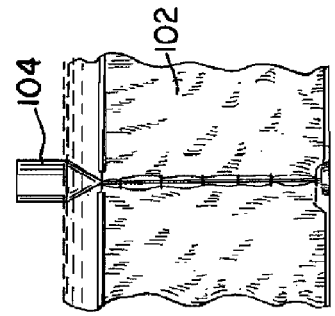
FIG. 14.
FIG. 15.

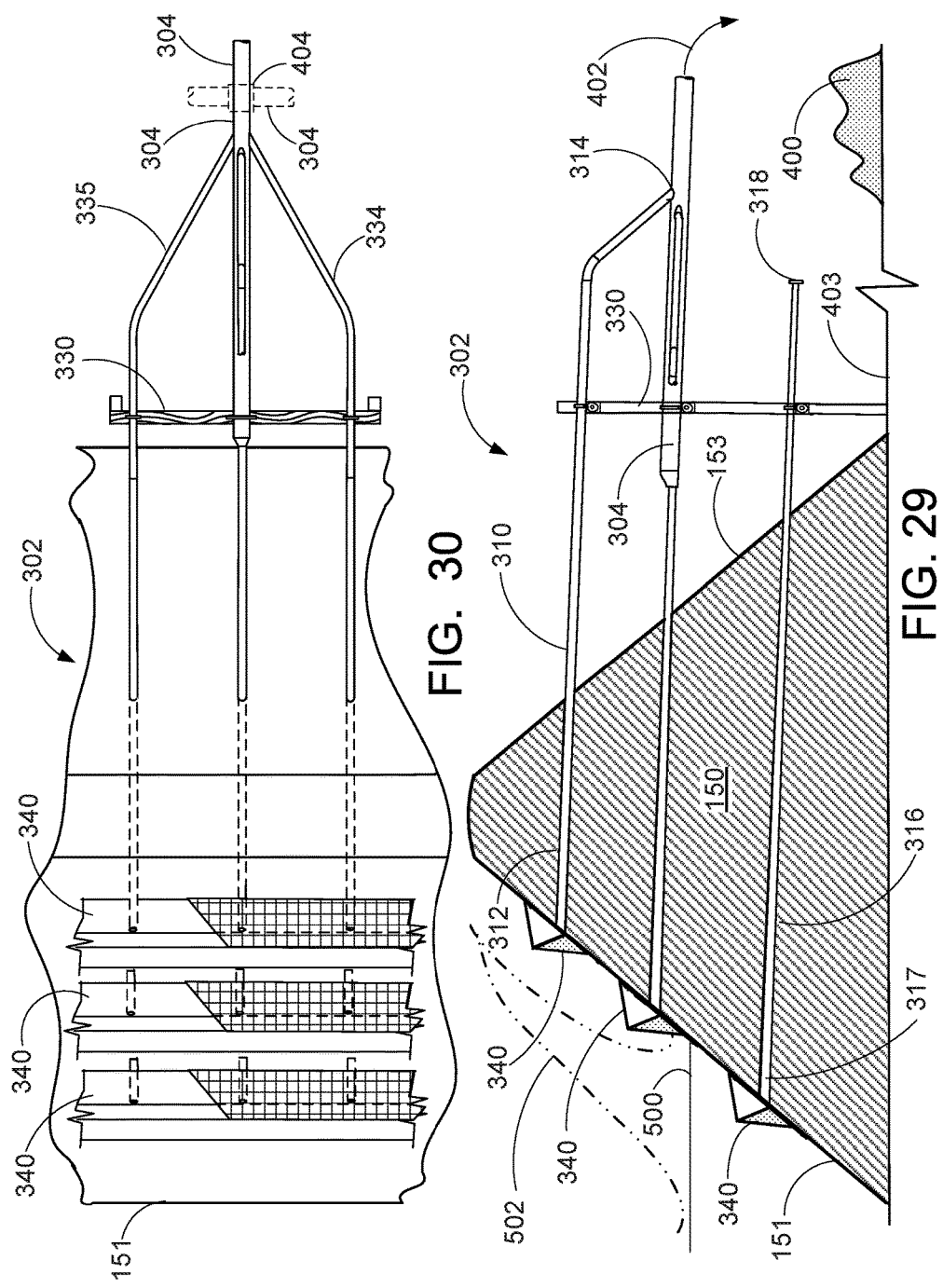

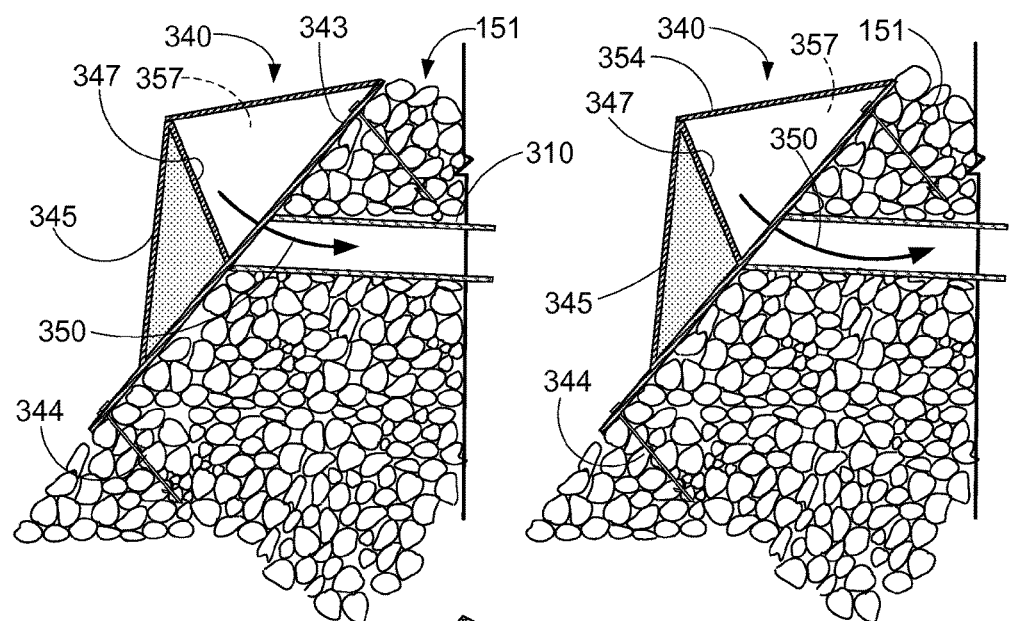
FIG. 32A
FIG. 32B
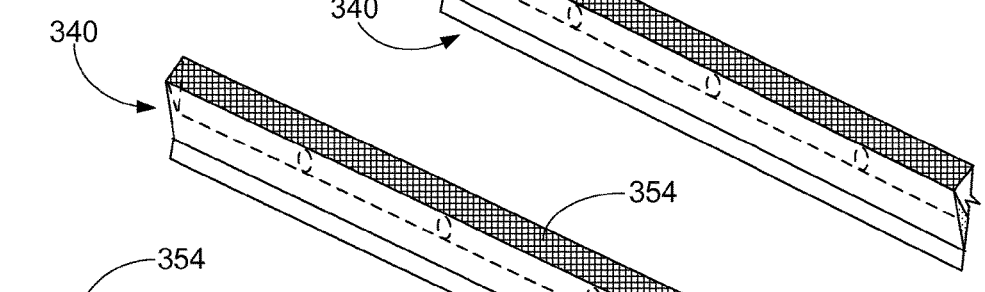
FIG. 33C
FIG. 33B
FIG. 33A

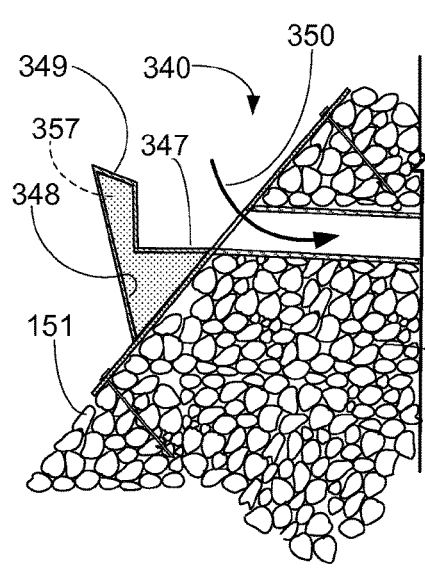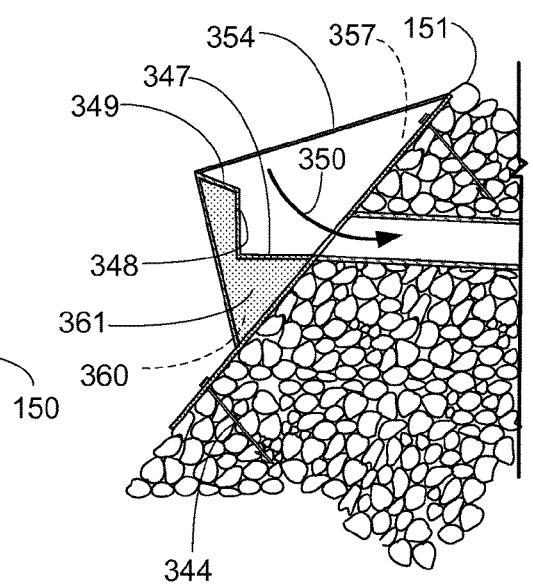
FIG. 35A                FIG. 35B
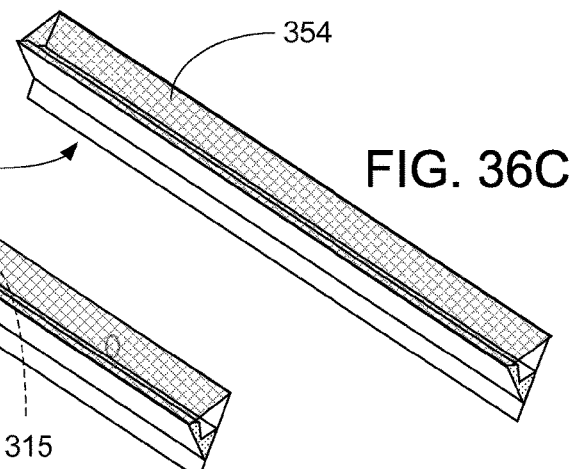
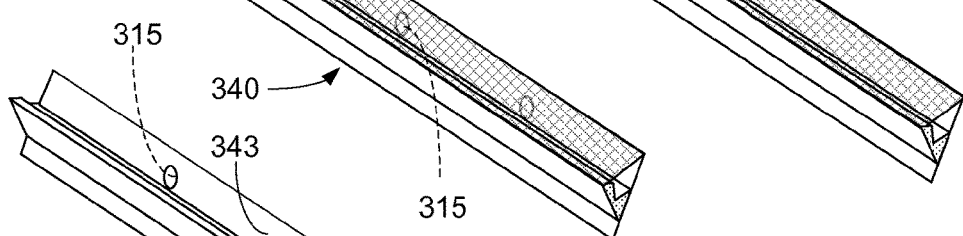
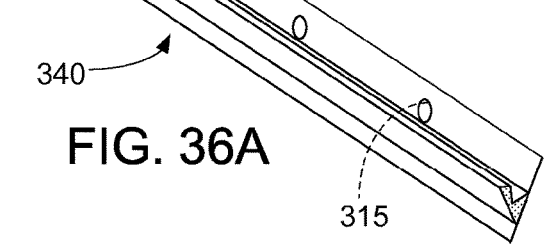
FIG. 36C
FIG. 36B
FIG. 36A

WAVE SUPPRESSOR AND SEDIMENT COLLECTION SYSTEM

CROSS-REFERENCE TO RELATED APPLICATIONS

This is a continuation of U.S. patent application Ser. No. 14/881,032, filed on 12 Oct. 2015 (issued as U.S. Pat. No. 9,885,163 on 6 Feb. 2018), which is a continuation of U.S. patent application Ser. No. 13/554,202, filed on 20 Jul. 2012 (issued as U.S. Pat. No. 9,157,204 on Oct. 13, 2015), which is a continuation-in-part of U.S. patent application Ser. No. 12/576,359, filed 9 Oct. 2009 (issued as U.S. Pat. No. 8,226,325 on 24 Jul. 2012), by the same inventor, incorporated herein by reference thereto.

Priority of U.S. patent application Ser. No. 14/881,032, filed on 12 Oct. 2015; U.S. patent application Ser. No. 13/554,202, filed on 20 Jul. 2012; and U.S. patent application Ser. No. 12/576,359, filed 9 Oct. 2009, which is incorporated herein by reference, is hereby claimed.

International Application Serial No. PCT/US2010/052182, filed 11 Oct. 2010, which was published on 14 Apr. 2011 and bears Publication No. WO2011/044556, is hereby incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to protection from coastline erosion caused by wave action or tidal surge and the restoration of coastline lost from such wave action or tidal surge activity. More particularly, the present invention relates to a wave suppressor and sediment collection system (sometimes referred to as the WSSC System) which is transportable and can be installed along a coastline which provides a sufficient barrier to disrupt the tidal wave flow into the coastline while at the same time allowing sediment to be carried through the system by the wave action and water currents and to be trapped and deposited at points between the system and the coastline to allow coastline restoration to occur.

2. General Background of the Invention

The loss of valuable coastline for states along the Gulf of Mexico, Atlantic Ocean and Pacific Ocean is a very serious problem. For example, using the Gulf of Mexico as an example, for thousands of years, the flow of the Mississippi River during flood stages, carried rich soil and sediment into Louisiana and the result was the creation of a vast fertile Mississippi River delta region which was inhabitable and where crops could flourish. In recent times, with the discovery of oil and gas beneath the Louisiana coast, oil companies have built a vast system of canals in order to allow boats and self-contained drilling rigs to be transported inland in order to recover the oil and gas. This vast system of canals has allowed the intrusion of salt water into the lower delta, and by doing so has killed off thousands of acres of valuable marsh land, which had helped maintain the valuable soil in place. In addition, the marshland served as a first barrier against the onslaught of hurricanes and helped slow down the movement of the storms and reduce the storm surge before the storm reached habitable portions of the state.

However, with the loss of valuable marsh grass, the soil became susceptible to erosion, and consequently miles of valuable coastline were lost. It is estimated that coastal erosion by the flow of the tides on a daily basis results in a loss of many square miles of coastline. Furthermore, the reduction in the marsh land has resulted in the reduction of protection from hurricane storm surge and wind velocity. Many believe that Hurricane Katrina was a prime example of a hurricane that came ashore and because there was little marshland to hinder its winds and surge, resulted in the enormous amount of wind and water to be carried far inland.

Therefore, there is a need in two vital areas. The first is a system, such as was provided by the barrier islands years ago, which would hinder or reduce the surge of tidal water inland during normal tidal cycles, and also during storms, so that the surge does not damage the coastline. Second, there is a need for a system which would allow the wave action to move through the system, carrying with it tons of sand and other silt material, buoyant in the water, but the sand and silt being trapped between the system and the shoreline and forced to be deposited and increase the solid material which would eventually form additional coastline.

The following U.S. Patents are incorporated herein by reference:

TABLE

| PAT. NO. | TITLE | ISSUE DATE DD-MM-YYYY |
|---|---|---|
| 3,373,568 | System for Reclamation of Land | Mar. 19, 1968 |
| 3,387,458 | Seawall Structures | Jun. 11 ,1965 |
| 3,632,508 | Method and Apparatus for Desilting and/or Desalting Bodies of Water | Jan. 4 ,1972 |
| 4,367,978 | Device for Preventing Beach Erosion | Jan. 11, 1983 |
| 4,479,740 | Erosion Control Device and Method of Making and Installing Same | Oct. 30, 1984 |
| 4,708,521 | Beach Building Block | Nov. 24, 1987 |
| 4,978,247 | Erosion Control Device | Dec. 18, 1990 |
| 7,029,200 | Shoreline Erosion Barrier | Apr. 18, 2006 |
| 7,165,912 | Apparatus for Rebuilding a Sand Beach | Jan. 23, 2007 |
| 7,507,056 | Apparatus for Controlling Movement of Flowable Particulate Material | Mar. 24, 2009 |
| 2009/0154996 | Shoreline and Coastal Protection and Rebuilding Apparatus and Method | Jun. 18, 2009 |
| 4,711,598 | Beach Erosion Control Device | Dec. 9, 1997 |

BRIEF SUMMARY OF THE INVENTION

The system of the present invention solves the problems in a straightforward manner. In a first principal embodiment, what is provided is a transportable system to reduce tidal surge wave action and provide land restoration along the shore of a body of water, such as a coastline, which includes a plurality of interconnected sections of the system, each section including a base, a forward wall, and a rear wall, having a plurality of fluid flow pipes extending from the forward wall to the rear wall, for allowing water including sediment to flow into the pipes at the forward wall and exit the pipes at the rear wall. There is further provided a one-way valve member at the rear wall exit of each pipe, so that water carrying sediment cannot return through the pipe as the wave action recedes from the coastline. To allow water to return to the body of water, there is provided a flow opening including a weir between multiple sections so that water is able to flow therethrough. Each of the sections would be self-contained, and constructed of a material to allow each section to be floated or transported to a location, wherein material, such as water, or the like, can be pumped into each section resulting in the section to sink and rest on the floor of the body of water, with an upper portion of the section extending a distance above the water surface. The sections would be interconnected and anchored to the floor, so as to provide a continuous system, interrupted only by the water return outlets as stated earlier.

The systems described above would further provide inlet and outlet valves on each individual section for allowing material to be pumped into each section in order to sink each section as described earlier; and when sections have to be transported to another location the valving would allow the material to be pumped from each section, resulting in each section becoming buoyant and transportable or barged to another location to be reassembled into multi-sections as described earlier.

Further, it is foreseen that the forward wall of each section would include a shelf or shoulder extending outward below each row of water flow pipes so as to catch any sediment that may not flow through the pipes initially, but would be carried through by a subsequent wave action.

In another embodiment, the system as described above would include a secondary system stationed in the water ahead of the system, which would include one or multiple barges, each barge having an air compressor system, preferably powered by wind and solar energy, to buildup compressed air in tanks, and upon water reaching a certain level, automatically releasing the compressed air through openings at the ends of a plurality of air lines which would be able to rove along the water bottom, resulting in the pressurized air stirring and fluffing up sand and silt from the water bottom. This would provide a great amount of additional sand and silt becoming suspended in the water and being carried through the land restoration system and deposited between the system and the coastline, thus greatly increasing the amount of sediment built up between the system and the coastline.

It is foreseen that as sediment is built up, as described above, the entire system could be relocated to another position in order to build up sediment in another area. The entire system could stretch over a short distance, or it could stretch over miles of coastline, depending on the need in an area.

In the most simple embodiment of the system, it is foreseen that when a rock jetty or dam is constructed, as of the type which will dam the opening of the "Mr Go" Channel in South Louisiana, a plurality of flow pipes of the type described above could be positioned through the rock dam, so that some water carrying sediment could flow through the pipes, but not an amount to cause a tidal surge, and in doing so would be depositing sediment on the land side of the dam, so that over time sediment is deposited to the point of resulting in land accumulation.

Therefore, it is a principal object of the present invention to construct a device that would suppress the energy of a wave to effectively break down the energy in a wave; use the energy of the wave to help collect sediment; and use the energy of the wave to help rebuild coastal south Louisiana.

It is a second principal object of the present invention to protect the environment by helping to collect sediment and protect the existing shore line, and helping to collect sediment and protect the existing levee systems exposed to open water.

It is a third principal object of the present invention to speed up sediment recovery by holding and preventing the sediment from leaving the confined area and returning to open water and be lost forever.

It is a fourth principal object of the present invention to act as secondary sediment barriers by confining sediment to certain areas, and using this newly developed method of keeping sediment suspended so as to take advantage of the energy found in the waves.

It is a fifth principal object of the present invention to provide a barrier made from concrete or recycled rubber material which is designed to float or made of a light material such as (HDPE) high density polyethylene, or lightweight concrete designed to float, or that can be made from recycled rubber, such as used tires, or that can use the most economical material.

It is a sixth principal object of the present invention to recycle the barrier device by removing the water from inside the barrier and float or barge to a new site and use it again.

It is a seventh principal object of the present invention to use the barrier wall as sediment retainer when sediment is pumped from a known source.

It is an eighth principal object of the present invention to provide a designated pipeline used to move sediment from a river by retaining most of the sediment if not all of it; stopping erosion of newly deposited material; and stopping polluting and contaminating areas that otherwise are not designed to receive any sediment.

It is a ninth principal object of the present invention to provide weirs strategically located to maximize the sediment recovery; and It is a tenth principal object of the present invention to be an island builder by completely surrounding an area, letting the waves bring the sediment and building up the island.

It is a further principal object of the present invention to provide a system which will be constructed and applied in such a way as to have no adverse effect of the ecology of the environment the WSSC System is placed into.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 8 is a partial overall view of a preferred embodiment of the WSSC System of the present invention being anchored in place while also illustrating water returning through the a weir between sections;

FIG. 9 illustrates a typical anchor utilized to anchor sections into the water bottom in the WSSC System of the present invention;

FIG. 10 is another side cutaway of a preferred embodiment of the WSSC System of the present invention illustrating water carrying sediment through the system;

FIG. 11 is a side cutaway of a preferred embodiment of the WSSC System of the present invention illustrating sediment buildup to the rear of the system;

FIG. 14 is an aerial view of the sediment being stirred up by the system described in FIG. 13;

FIG. 15 is a view along lines 15-15 in FIG. 14, which illustrates one of the buoys used to support the net surrounding the sediment stirring system illustrated in FIG. 13;

FIG. 29 illustrates a cross-section view of the WSSC System along lines 29-29 in FIGS. 27 and 28;

FIG. 30 illustrates a top view of the collection component of the WSSC System installed within a rock jetty and terminating on its end in a continuous trough for receiving the water and sediment flow into the collection component;

FIGS. 32A and 32B illustrate cross-section views of a single collection pipe in a collection component of the WSSC System and the first embodiment of the construction of the continuous trough for receiving the flow of water and sediment into the collection component;

FIGS. 33A through 33C illustrate cutaway views of the troughs secured to the ends of the collection pipes used in the first embodiment of the construction of the continuous trough used in the WSSC System;

FIGS. 35A and 35B illustrate cross-section views of a single collection pipe in a collection component of the WSSC System and the second embodiment of the construction of the continuous trough for receiving the flow of water and sediment into the collection component; and FIGS. 36A through 36C illustrate cutaway views of the troughs secured to the ends of the collection pipes used in the second embodiment of the construction of the continuous trough used in the WSSC System.

DETAILED DESCRIPTION OF THE INVENTION

Figure 12A:
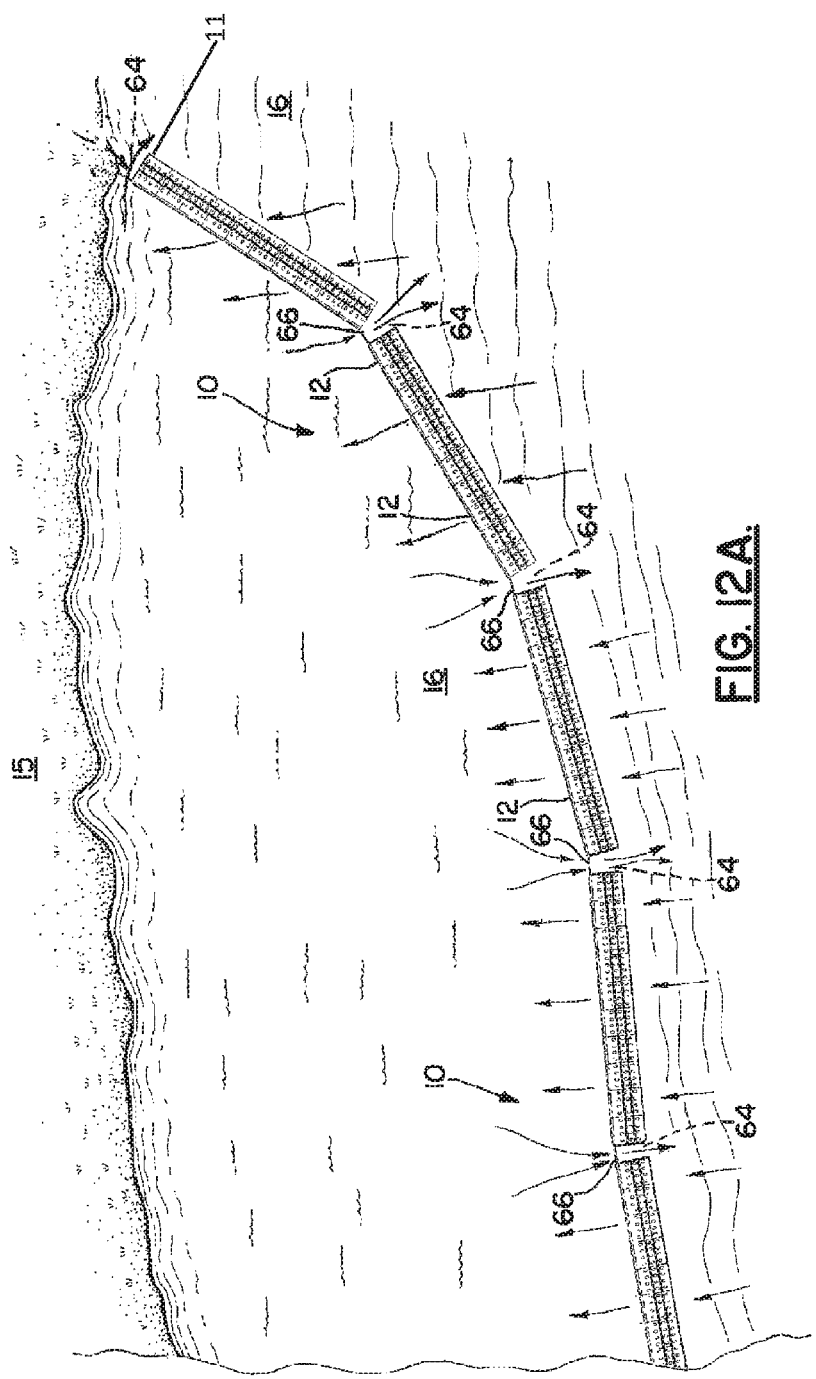
FIG. 12A is an aerial view of the WSSC System in place along a shoreline in a body of water.

FIGS. 1 through 36C illustrate preferred embodiments of the Wave Suppressor and Sediment Collection (WSSC) System 10 of the present invention, as seen in overall aerial view in FIG. 12A, where the system 10 is in place near a shoreline 15. However, for details of the WSSC system 10, reference is made to various drawing FIGS. 1 through 17, as it would be used as a free-standing system. FIGS. 18 through 25 illustrate a first embodiment of the WSSC System positioned within a rock jetty. FIGS. 26A through 36C illustrate a second embodiment of the WSSC System positioned within a rock jetty. Before reference is made to the WSSC System installed through a rock jetty, the WSSC System will be described when it is self-standing in place near a shore line as set forth in FIGS. 1 through 17.

Figure 1:
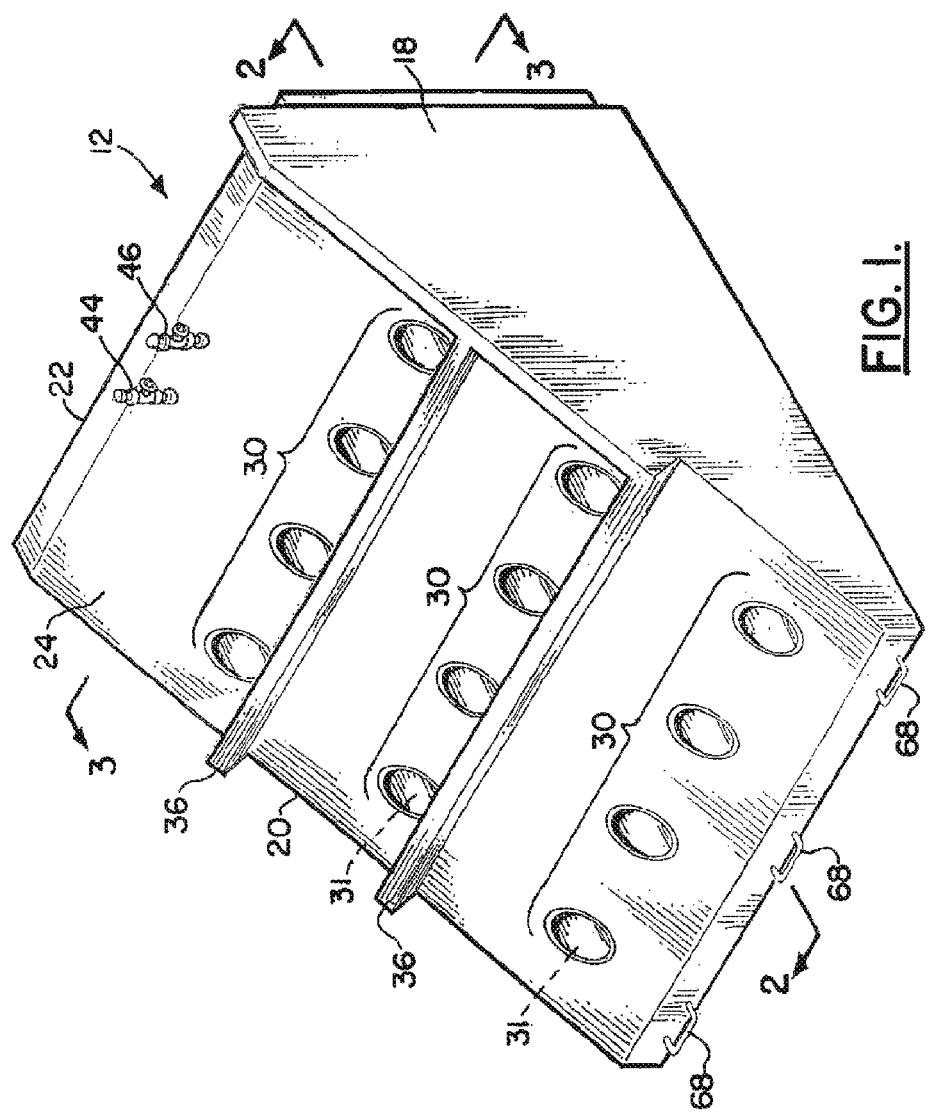
FIG. 1 is an overall perspective view of a section in a preferred embodiment of the WSSC System of the present invention.
Figure 2:
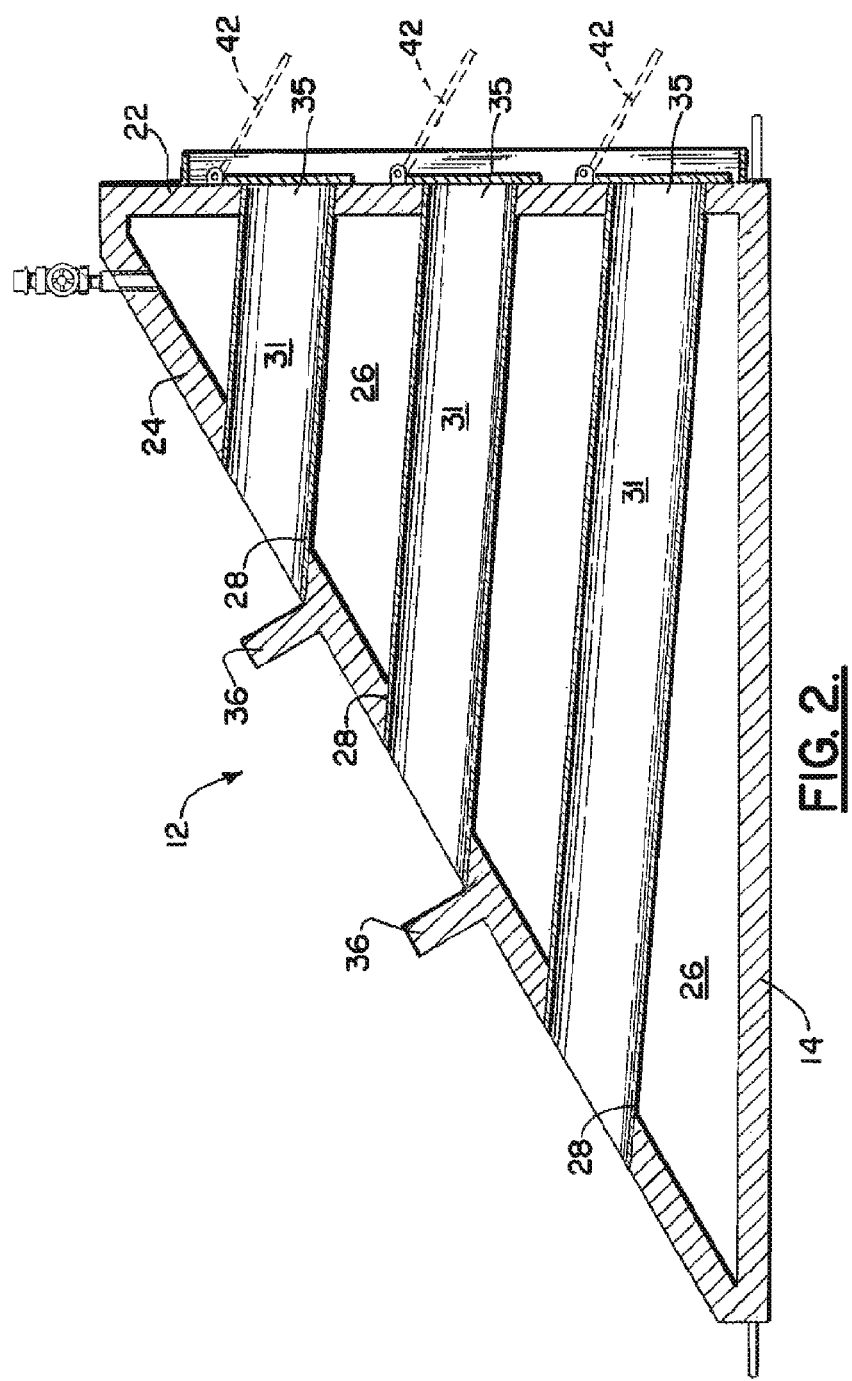
FIG. 2 is a side cutaway view along lines 2-2 in FIG. 1 of a preferred embodiment of the WSSC System of the present invention.
Figure 3:
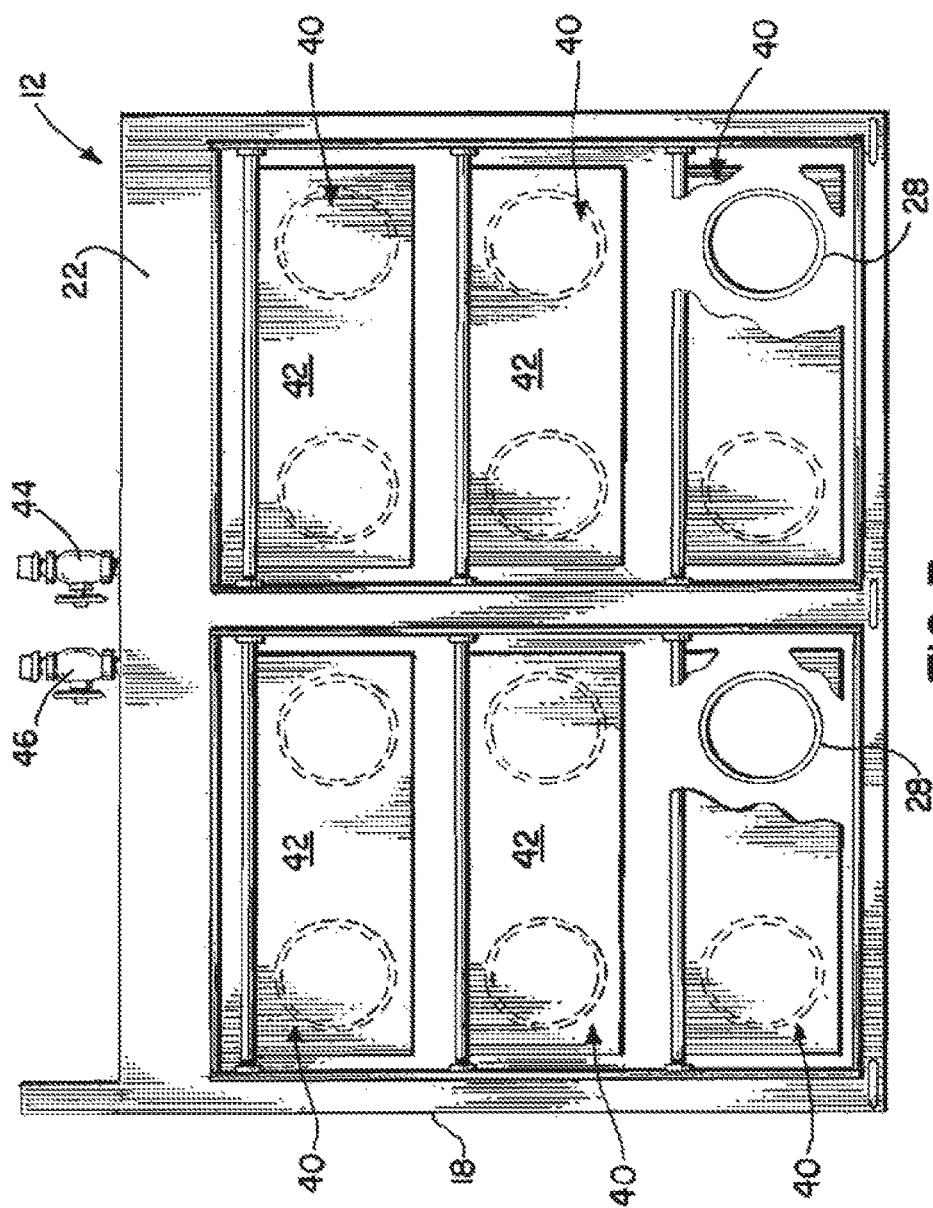
FIG. 3 is a rear partial cutaway view along lines 3-3 in FIG. 1 in a preferred embodiment of the WSSC System of the present invention.

The WSSC System 10 of the present invention comprises a plurality of sections 12 that will be more fully described in FIGS. 1 through 3. As illustrated, each section 12 includes a base 14 for resting on a sea floor 16. There is provided a pair of substantially triangular shaped side walls 18, 20, a rear wall 22 and sloped top wall 24, all together defining an interior space 26 therein. It is foreseen that each section 12 would be fabricated from a material, such as rubber, from discarded tires, or other material, such as high density polyethylene (HDPE) or concrete, if necessary. Each section 12 further comprises a plurality of tubular members 28, such as PVC pipe having a certain diameter, preferably set in three rows 30, the tubular members 28 extending from the top wall 24, through the space 26 and terminating in the rear wall 22. Each tubular member has a flow bore 31 therethrough for allowing water 32 carrying sediment 34 (See FIG. 10, e.g.) to flow from a point in front of each section 12, through each tubular member 28, and exit through the rear opening 35 of each tubular member 28, through the rear wall 22 to a point to the rear of each section 12, into the area 37 between the system 10 and a shoreline, as will be described further. As seen in side view in FIG. 2, each tubular member 28 has a slight incline from its top wall 24 to the rear wall 22 to facilitate flow of water 32 and sediment 34 through each member 28. The upper and middle sections 12 include a shelf or shoulder 36 across the width of the top wall 24, but not the bottom section 12. It should be noted that shelf 36 could also be used on the first row if needed and would not cause scouring of sand or other sediment under the unit. An illustration where this is applicable is found in FIG. 25 where the rock jetty extends beyond the lower edge of each unit. In that figure, the rock jetty extends beyond the unit preventing a backwash.

The importance of the shoulder/shelf 36 cannot be overemphasized, and the effects it has on waves and how it helps in collection additional sediment. In the upward movement of a wave, the shelf 36 shears part of the wave, breaking up the wave and dispersing of some of the energy, while redirecting some of the wave energy, thus forcing water and sediment into the tubular member. Downward movement or retreating wave, shears part of the wave, breaking up the wave and dispersing of some of the energy, while redirecting some of the wave energy, thus forcing water and sediment into the tubular member. The shelf 36 also catches any additional sediment; i.e., sediment that did not flow in the tubular member will remain trapped because of the shoulder/shelf location to the tubular opening. The next wave will wash this additional sediment through the tubular member. The shoulder/shelf location and design makes the collection of sediment more efficient.

Each shelf 36 set below the second and third rows 30 of tubular members 28, as seen in FIG. 1, would catch any sediment 34 which did not flow into the tubular members 28, and would be washed through with the next wave of water 32. Also, as seen in FIG. 3, at the rear opening 34 of each tubular member 28 there is provided a one way flapper valve 40, of the type known in the industry, which would allow the water 32 carrying sediment 34 to exit the tubular member 28, but would not allow the water 32 and sediment 34 to return into the tubular member 28, once the valving member 42 of valve 40 closes. Finally, although this will be described more fully, each section 12 is provided with an inlet valve 44 and outlet valve 46 on its top wall 24 to allow water or other substance to be pumped into and out of the interior space 26, for reasons to be explained further.

Figure 4:
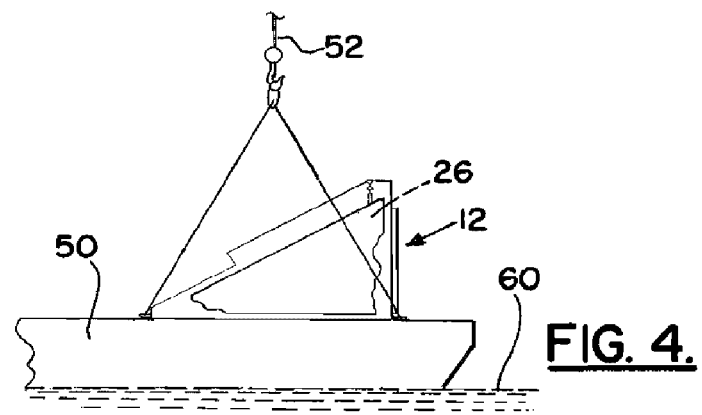
FIGS. 4 through 7 illustrate the method of installing the components of the WSSC System of the present invention.
Figure 5:
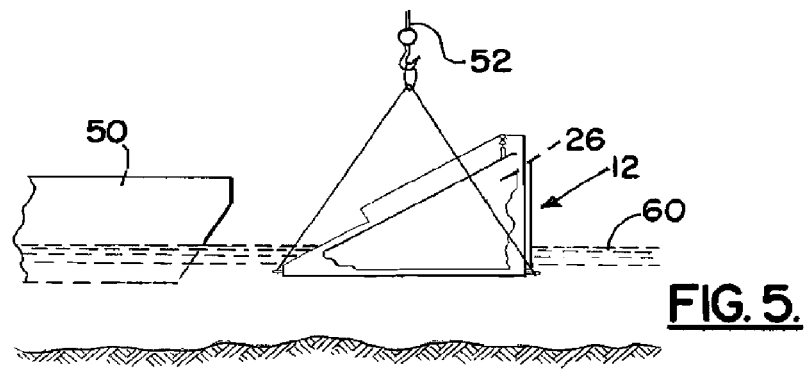
Figure 6:
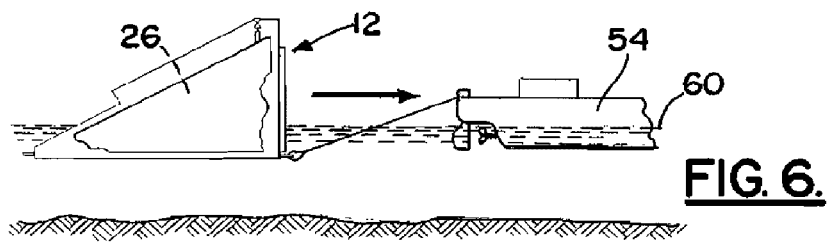
Figure 7:
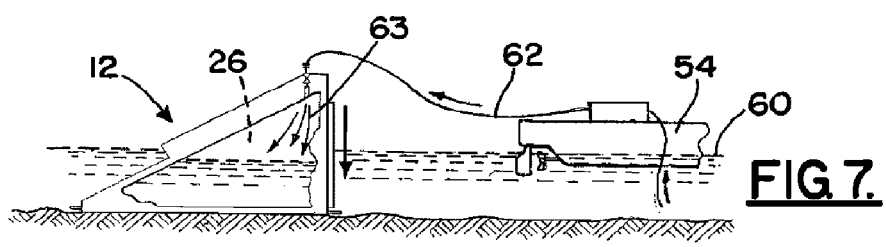

As was stated earlier, the WSSC System 10 is comprised of a plurality of sections 12 to make up the entire system along a shoreline or the like. FIGS. 4 through 7 illustrate the manner in which each section is placed on site in the body of water. In FIG. 4 there is seen a barge 50 carrying a typical section 12, as described above, the section 12 having the capability to be hoisted from the barge 50 by a crane on the barge 50. As seen in FIG. 5, the section 12 has been lifted from barge 50 by cable 52 and placed in the body of water 60, where because of the space 26 within the closed section 12, the section 12 is buoyant and able to float. Next, as seen in FIG. 6, a boat 54 would tow the section 12 to a desired point in the body of water 60. Once in place, a flow line 62 would be attached to the inlet valve 44 on section 12, and water or other fluid (arrows 63) would be pumped into the interior space 26 of a sufficient quantity in order to allow section 12 to rest on the sea floor 16. This process would be repeated for each section 12 brought on site.

As will be described further, the multiple sections 12 would be attached to one another and anchored to the sea floor 16, as seen in FIG. 8. In this figure, there is provided a plurality of sections 12 attached to one another along their side walls 18, 20. It should be noted that since the water 32 carrying the sediment 34 is unable to return to a point in front of the section 12, due to the action of the one way flow valve 40 as described earlier, there must be a means by which the water 32 is allowed to return to the open sea 61. FIG. 8 illustrates a flow opening 64 set at intervals between multiple sections 12, the opening 64 including a weir 66 in place, so that the water 32 is able to flow over the weir 66 and return to the open sea 61, but the weir 66 prevents sediment 34 from being carried back into the open sea 61, so that the sediment is collected between the system 10 and the shoreline.

As seen also in FIG. 8, there is provided a system for anchoring the various sections 12 of the system 10 to the sea floor 16. As illustrated each section includes a plurality of anchor loops 68 along the front and rear bottom edges 70 of the top wall 24, which would serve to engage the top anchor portion 72 of an elongated anchoring member 74, as seen in FIG. 9, that would be bored into the sea floor 16, and once in place, as seen in FIG. 9, would be attached to each anchor loop 68, to hold each section 12 in place. As seen in FIG. 8, each section 12 would have preferably three anchor loops 68 along its front edge, and three along its rear edge, each loop secured to the anchor portion 72 of three members 74.

FIGS. 10 and 11 illustrate the manner in which the system 10 operates to suppress wave action while at the same time collecting sediment to the rear of the system 10. Periodic waves going over the units or sections are not necessarily harmful; these waves carry larger volumes of sediment meaning more sediment will be collected and recovered. As illustrated first in side cutaway view in FIG. 10, each section 12 while resting on the sea floor 16, the upper part 17 of the triangular shaped section 12, as seen in side view, is extending out of the water. This feature is important, since by extending out of the water, it will serve as a partial barrier or will serve to suppress the action of the wave 80 as the wave 80 flows by the system 10, which would be beneficial to the coast line by reducing or eliminating erosion of precious coast line.

While the system 10 is serving that function, its second and equally important function is also illustrated in FIGS. 10 and 11. As illustrated the water 32 in wave 80 crosses the system 10, the water 32 is carrying a certain quantity of sediment 34 stirred up from the sea floor 16. The water 32 and sediment 34 flow through the plurality of tubular members 28 and sediment is deposited to the area 84 of the sea to the rear of the system 10. As the waves 80 continue to flow over and through the system 10, more and more sediment 34 is collected in the area 84, and the water flows back to the sea through openings 64 formed in the system 10. As seen in FIG. 11, the sediment 34 has collected to a height where the lowermost tubular members 28 are completed blocked by the build up of sediment 34. This buildup may continue until the sediment 34 builds higher to a point where the flow through the members 28 could be completely blocked. This would be the point at which the system 10 would need to be moved further out from the shoreline if so desired.

This would be accomplished by removing the anchors 72 from each section, placing the flow line 62 onto the outlet valve 46 on each section 12, and pumping the fluid out of the interior 26 of each section 12. The section 12 would become buoyant once more, and the reverse steps would be taken as seen in FIGS. 4 through 7. The boat 54 would tow each section 12, where a cable would be attached to the section 12, which would then be lifted onto a barge 50 and floated to the next destination. If the destination were close by, the boat 54 could simply tow the section 12 to the location without having to lift the section 12 onto a barge 50. Then steps 4 through 7 would be repeated in placing each section 12 at its new location, where together the sections 12 would form a new system 10 within the body of water.

Following the discussion of the manner in which the system 10 operates, reference is made to FIG. 12A, where an entire system 10 has been anchored in place to the sea floor 16 and along a shoreline 15, with both ends 11 (only one shown) of the system 10 anchored to the shoreline 15, to encompass a certain area of a bay or water inlet. In FIG. 12A, the system 10, in its operation, as will be described below, is seen with the plurality of sections 12, secured side by side, with openings 64 placed between multiple sections 12, to allow the tide to return to the sea, through the openings 64, and each opening 64 having a weir 66 in place to stop sediment 34 to return to the open sea. So, in effect, the system 10, is operating to collect sediment 34 in the water between the system 10 and the shoreline 15, while at the same time suppressing the wave action which damages the coastline. It should be made clear that the system 10, for example, as seen in FIG. 12A, could be arranged in a different configuration other than a straight line, side by side, so as to take advantage of currents as well as wave actions in a particular body of water.

Figure 12B:
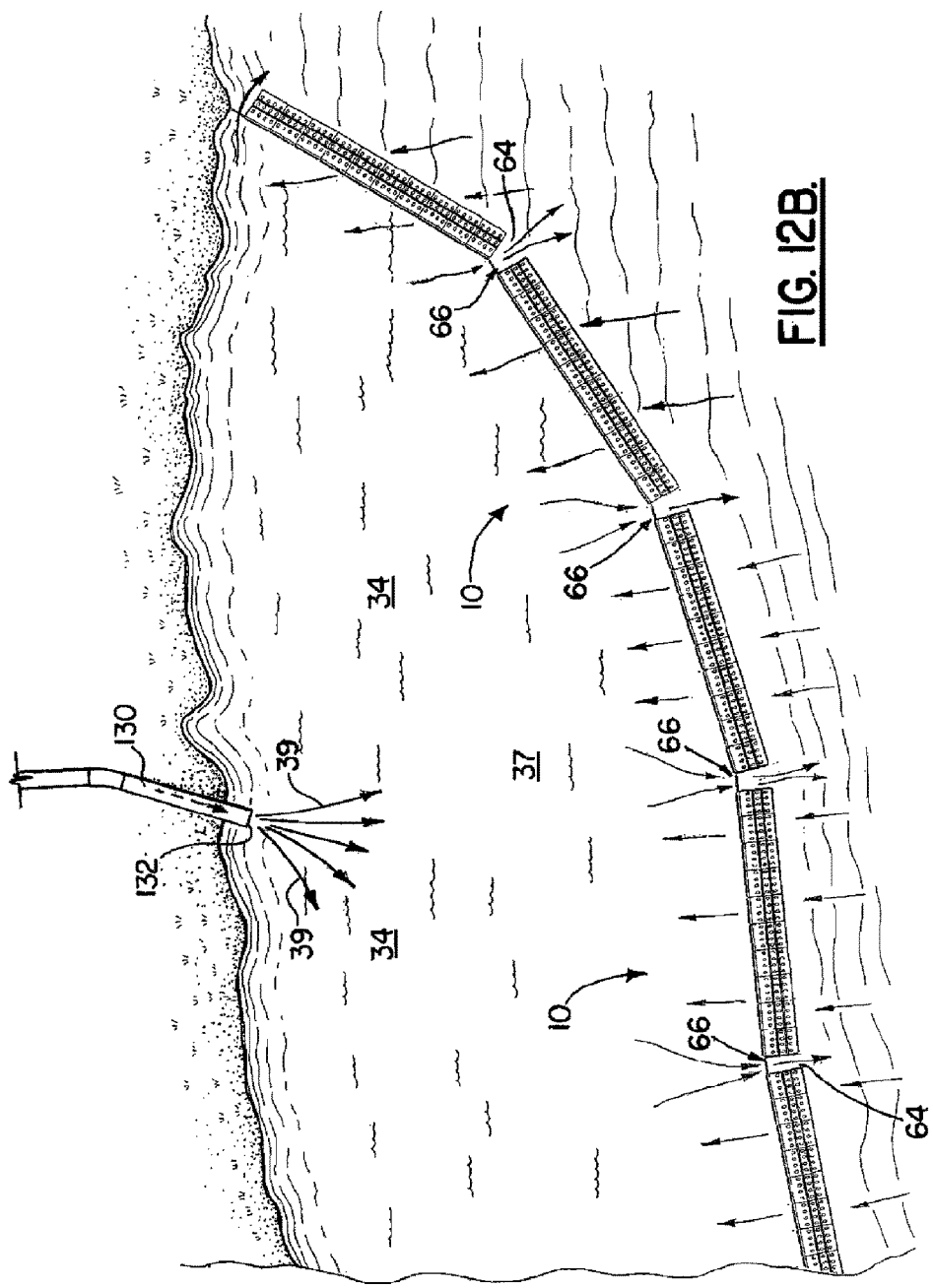
FIG. 12B is an aerial view of the WSSC System in place along a shoreline in a body of water with sediment being pumped in via a pipe from the shore.
Figure 13:
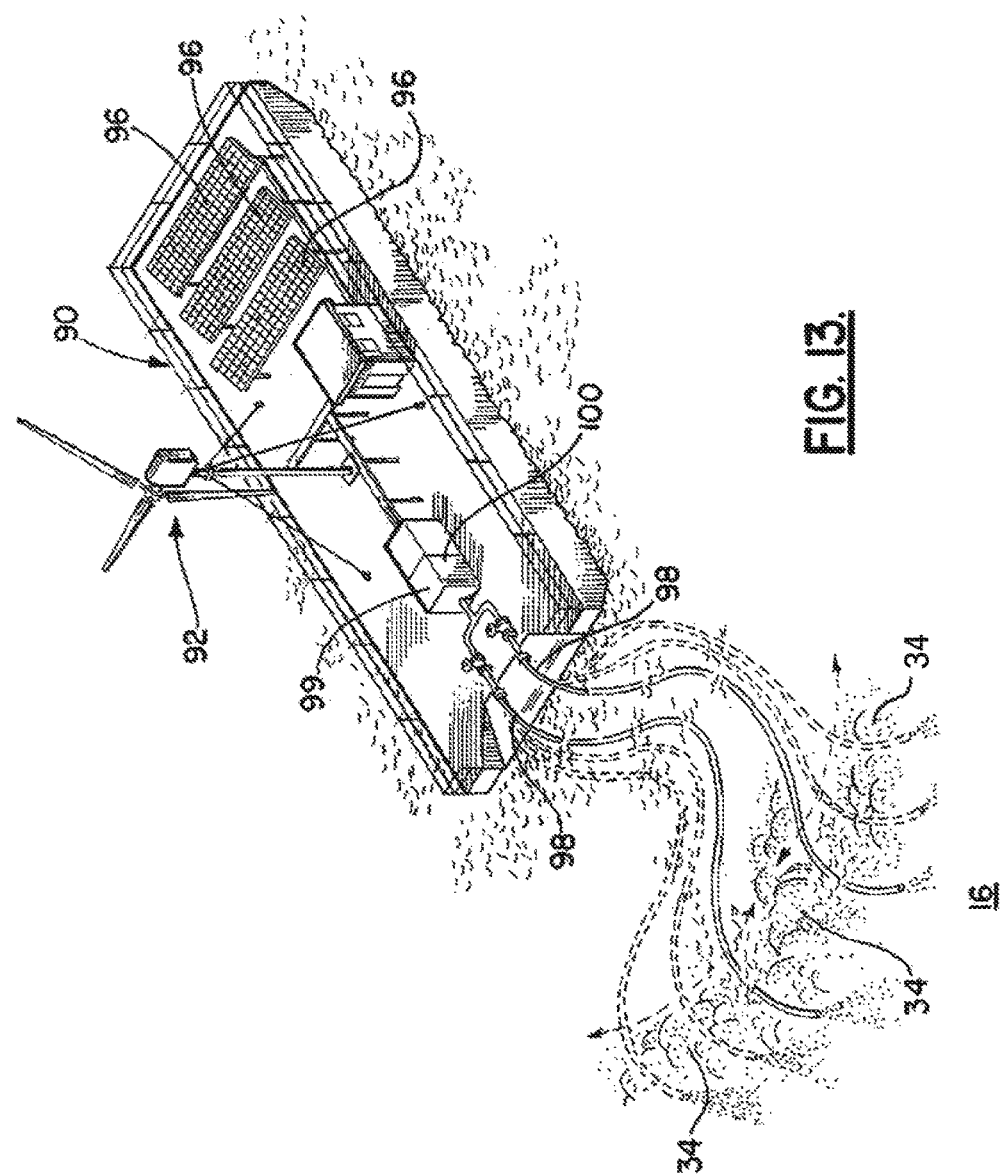
FIG. 13 is an overall view of a system utilized to stir up sediment to be carried by the water through the WSSC System of the present invention.

Another feature of the system's operation is seen in FIG. 12B. As seen in this figure, the system 10 is in place as described in FIG. 12A. However, here there is a pipe 130 which is delivering sediment 34 being pumped from a location inland and flowing from the end 132 of pipe 130 into the bay or inlet, as seen by arrows 39. With the system 10 in place, the sediment is captured within the confines of the system 10, within area 37, and will not escape, although water flow will continue through the spaces 64 where the weirs 66 are in place. Therefore, not only is sediment 34 being deposited from the normal wave action of the sea, but also additional sediment 34 is being pumped in and kept in place by the barrier formed by system 10.

Returning now to the system 10, as was stated earlier, a most important aspect of this system 10 is the collection of sediment 34 to help rebuild an eroded coastline or other sea area. To facilitate that function, further, reference is made to FIGS. 13 through 15. In these figures there is seen a system for providing a greater quantity of buoyant sediment 34 in the water which will be flowing through the system toward the coastline. As illustrated first in FIG. 13, there is provided a specially equipped barge 90 which would include components that would be powered by wind and solar power. There is provided a windmill 92 on the barge which would be of the type to provide power to be stored in batteries for powering equipment on the barge 90. There would also be provided a bank of solar panels 96, again to supply a source of power to be stored in batteries for powering equipment on the barge. The barge 90 would include generators which would power air compressors 99 for compressing air into storage tanks 100. The storage tanks 100 would have a plurality of air lines 98 extending from the barge 90 to the sea floor 16. There would be an automatic system for releasing the compressed air from the tanks 100 through the lines 98 to exit at nozzles at the end of the lines 98. The compressed air being released would stir up the sediment 34 on the sea bed 16, which would allow the waves 80 to carry a great quantity of additional sediment 34 through the system 10 to be deposited at an even greater rate. Since the barge system is automatic, the flow of air would be triggered by timers or the like, and would be shut off so that the air compressors 99 could re-fill the tanks 100 with compressed air. The barge 90, of course, could change locations as needed for the system 10 to gain maximum use of the flow of additional sediment 34 through the system 10.

FIG. 14 illustrates an aerial view of the system 10 using the specially equipped barge 90 in inducing the flow of additional sediment 34. As illustrated, while the barge 90 is being used, there would be provided a net 102 in place around the outer perimeter of the system 10, with the net 102 held in place by a plurality of spaced apart anchored buoys 104, of the type illustrated in FIG. 15, so that water 32 and sediment 34 flow through the net 102, but sea life is prevented from moving into the area where it could be injured or killed by the air flow lines operating on the floor 16 of the sea. It should be made clear that in place of net 102 there could be provided a sediment barrier set in place, of the type commercially available in the art.

Figure 16:
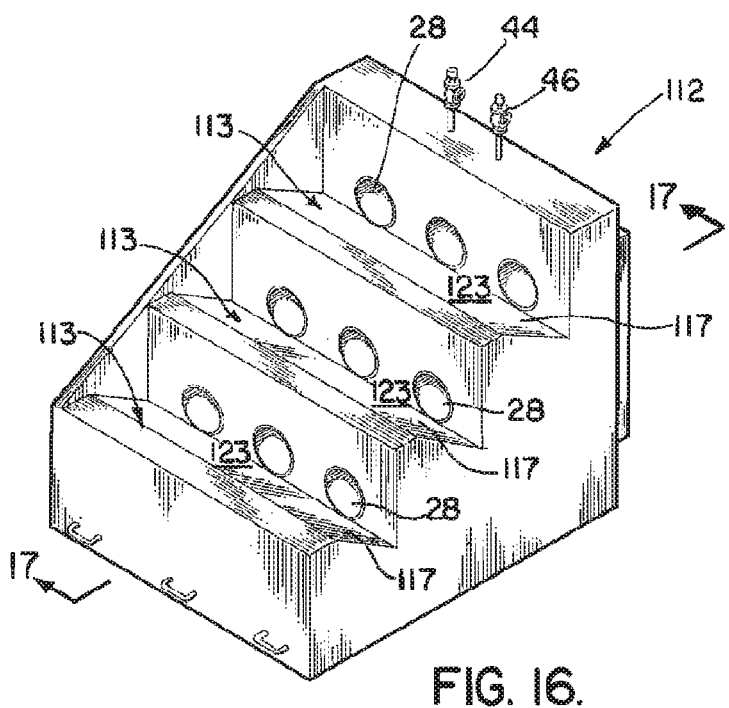
FIG. 16 is an overall view of an alternative embodiment of a section used in the WSSC System of the present invention.
Figure 17:
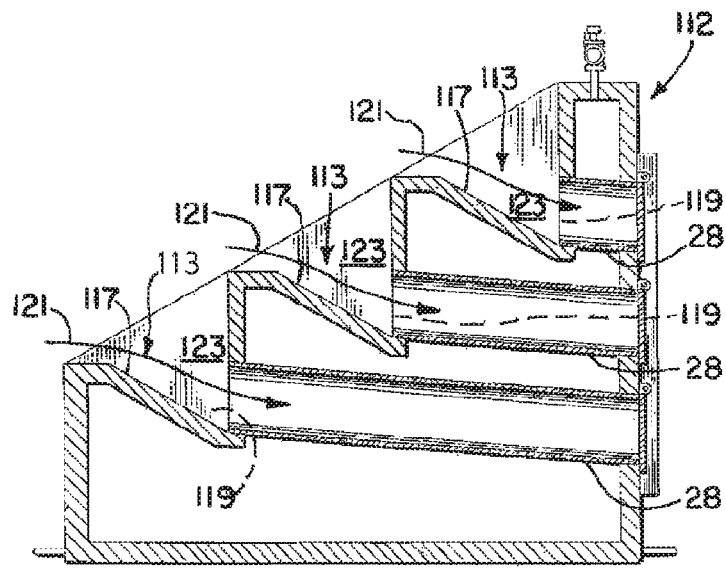
FIG. 17 is a side cutaway view of an alternative embodiment of a section taken along lines 17-17 in FIG. 16.

While the system 10 as described above is very capable of achieving the ends desired, it is foreseen that each section 12 may be configured slightly different than that as illustrated in FIGS. 1 through 3. Reference is made to FIGS. 16 and 17, where there is illustrated a section 112, where the top wall 26 of the section 112 has been changed from the flat top wall 26 of section 12 as seen in FIG. 1, to a series of steps 113, where the floor 117 of each step 113 would be slanted down to the entry 119 of each tubular member 28. Therefore, as water 32 and sediment 34 would wash across each section 112, the water 32 and sediment 34 would flow down along the floor 117 of each step 113, in the direction of arrows 121, so that the area 123 at the entrance of each tubular member 28 would serve as a collection area for sediment 34, until the sediment 34 is carried into and through the tubular members 28 by the next wave or tidal action. This configuration would provide greater assurance that the maximum amount of sediment 34 is being captured at the front of the section 112, so that it can be moved through the members 28 to the rear of the section 112 for greater building of sediment were desired.

Figure 19:
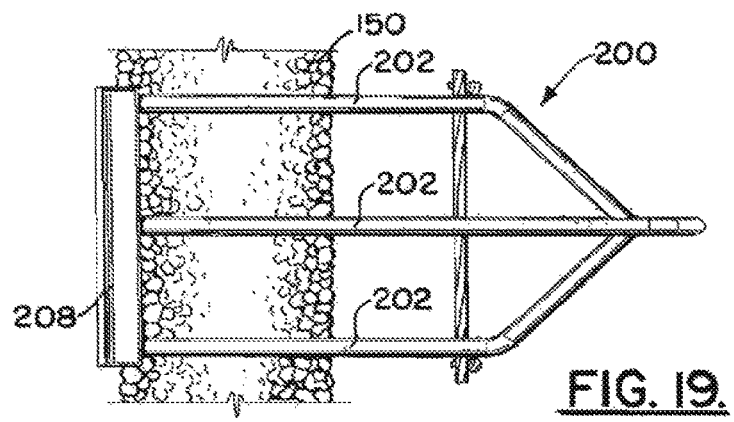
Figure 20:
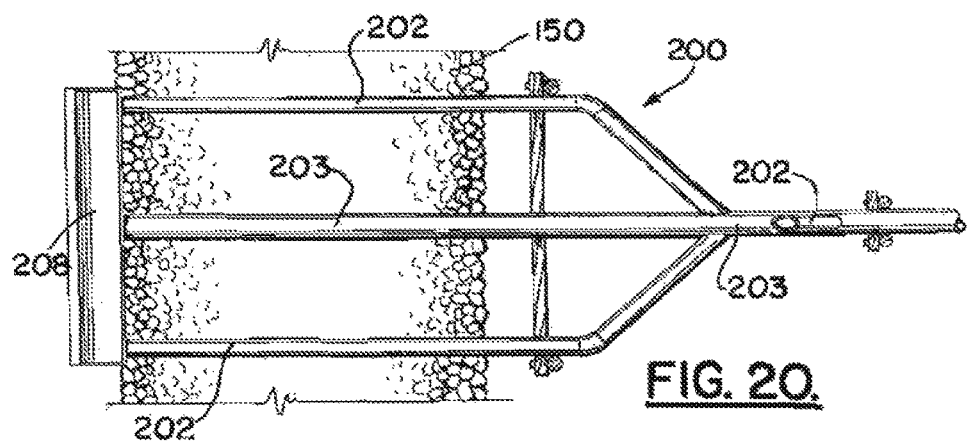
Figure 21:
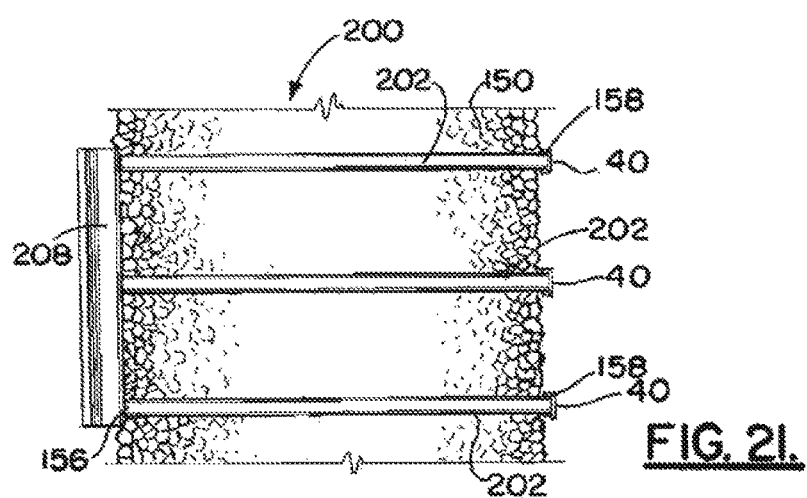
Figure 22:
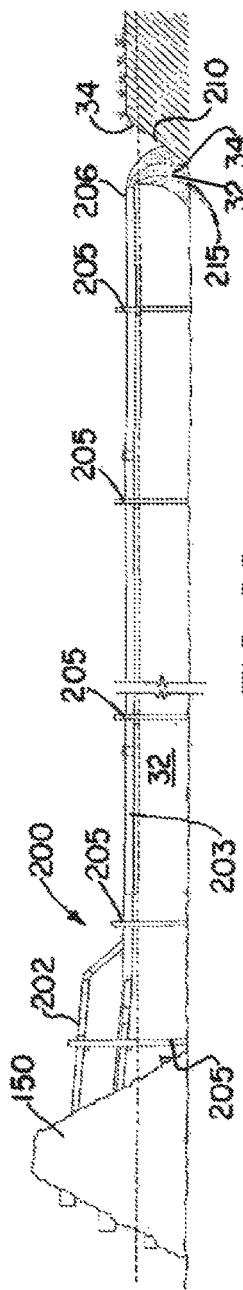
Figure 23:
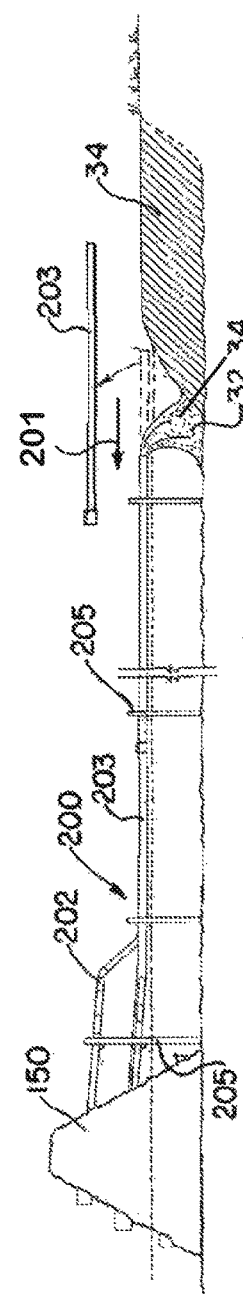
Figure 24:
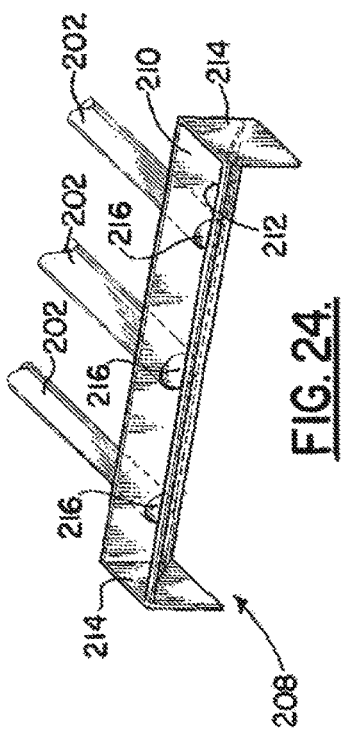

Reference is now made to FIGS. 18 through 24, where a first embodiment of the WSSC System, labeled System 200 is incorporated into a rock jetty 150, of the type which has been constructed to block the entrance to the waterway referred to as Mr. Go in South Louisiana. As illustrated in top views in FIGS. 19 through 21, there is provided a rock jetty 150 into which the system 200 is incorporated. In FIG. 21, taken along lines 21-21 in FIG. 18, it is foreseen that the base 152 of the jetty 150 would be laid in place, and then a plurality of elongated pipes 202 would extend from the forward point 156 of jetty 150, in this case three pipe sections 202 to the rear point 158 of rock jetty 150. At the forward point 156, the three pipes 202 would extend from a trough 208, as illustrated in FIG. 24, having an upright rear wall 210, a angulated floor 212, and a pair of side walls 214, so that the trough 208 would serve to capture the flow or water 32 carrying sediment 34, and the angulated floor 212 would direct the water and sediment into the entrance 216 to the pipes 202 more efficiently, to be carried to the rear of the jetty 150. The pipe sections 202 in this lower level of pipes 202 would terminate and dump water 32 and sediment 34 to the rear of the jetty 150, and each pipe would be equipped with a flapper valve 40 to maintain the sediment 34 in place.

Figure 18:
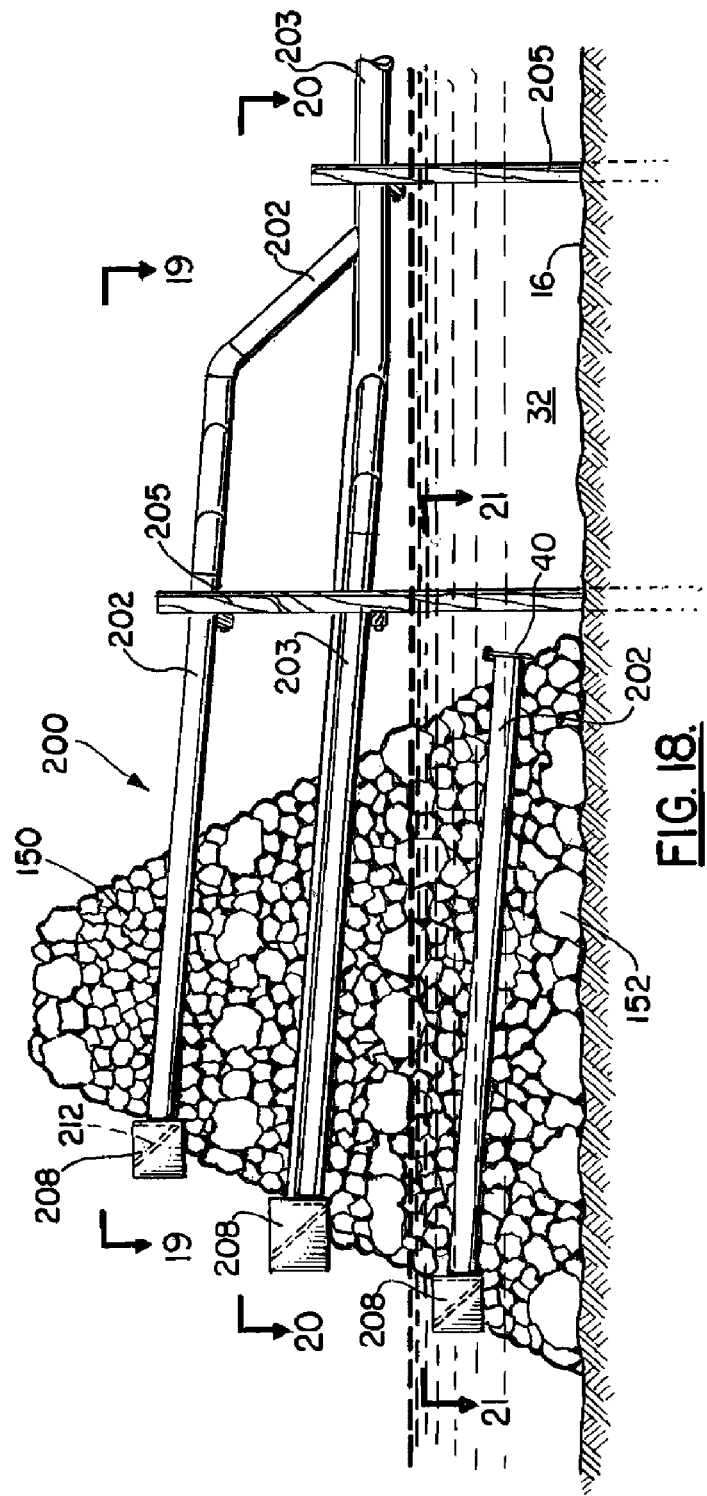
FIGS. 18 through 24 illustrate the principal embodiment of the WSSC System of the present invention as it would be installed to function positioned through a rock jetty.

FIG. 20 illustrates the second level of pipes as shown along lines 20-20 in FIG. 18. This second or middle level of pipes 202 would capture water 32 and sediment 34 in the same manner as described in FIG. 21, but in this case, the pipes 202 would all converge and empty into a principal flow pipe 203, somewhat larger in diameter, to carry the water and sediment further to the rear of jetty 150, as will be described further.

FIG. 19 illustrates the three pipes 202 at the upper most level in jetty 150, as seen along lines 19-19 in FIG. 18. This group of pipes 202 would also collect water 32 and sediment 34 in the same manner as the lower and middle sections. However, because the upper section of pipes 202 are positioned higher, the pipes 202 would be diverted downward, as seen in FIG. 18, to dump into the principal flow pipe 203 to be carried rearward.

In FIG. 22 there is illustrated WSSC System 200 in side view where the principal pipe 203, as described earlier, is extending rearward to a predetermined distance, and is supported in its path by a plurality of upright piers or pilings 205, until the rear end 206 of the pipe reaches its destination. In this embodiment, the pipe 203 is carrying water 32 and sediment 34 to a point 215 where sediment 34 has been deposited earlier. Therefore, additional sediment 34 will be dumped so as to continue to build up sediment in the direction of arrow 201 (see FIG. 23). As seen in FIG. 23, once the pipe 203 has deposited sediment at its end to the height desired, a section of principal flow pipe 203 is removed, and the sediment 34 will continue to dump sediment 34 so that the sediment buildup continues to fill the gap between the furthest point from the jetty 150, until theoretically, sediment 34 is built up to the base of jetty 150. Since in the case of the waterway Mr. Go, not only would the waterway be closed via the rock jetty 150, but with this system 200 in place, the entire body of water between the jetty 150 and the far end of the Mr. Go waterway, could be filled with sediment 150, simply through the constant wave action of the sea. The result is the rebuilding of valuable coastline which has been eroded away in the past.

Figure 25:
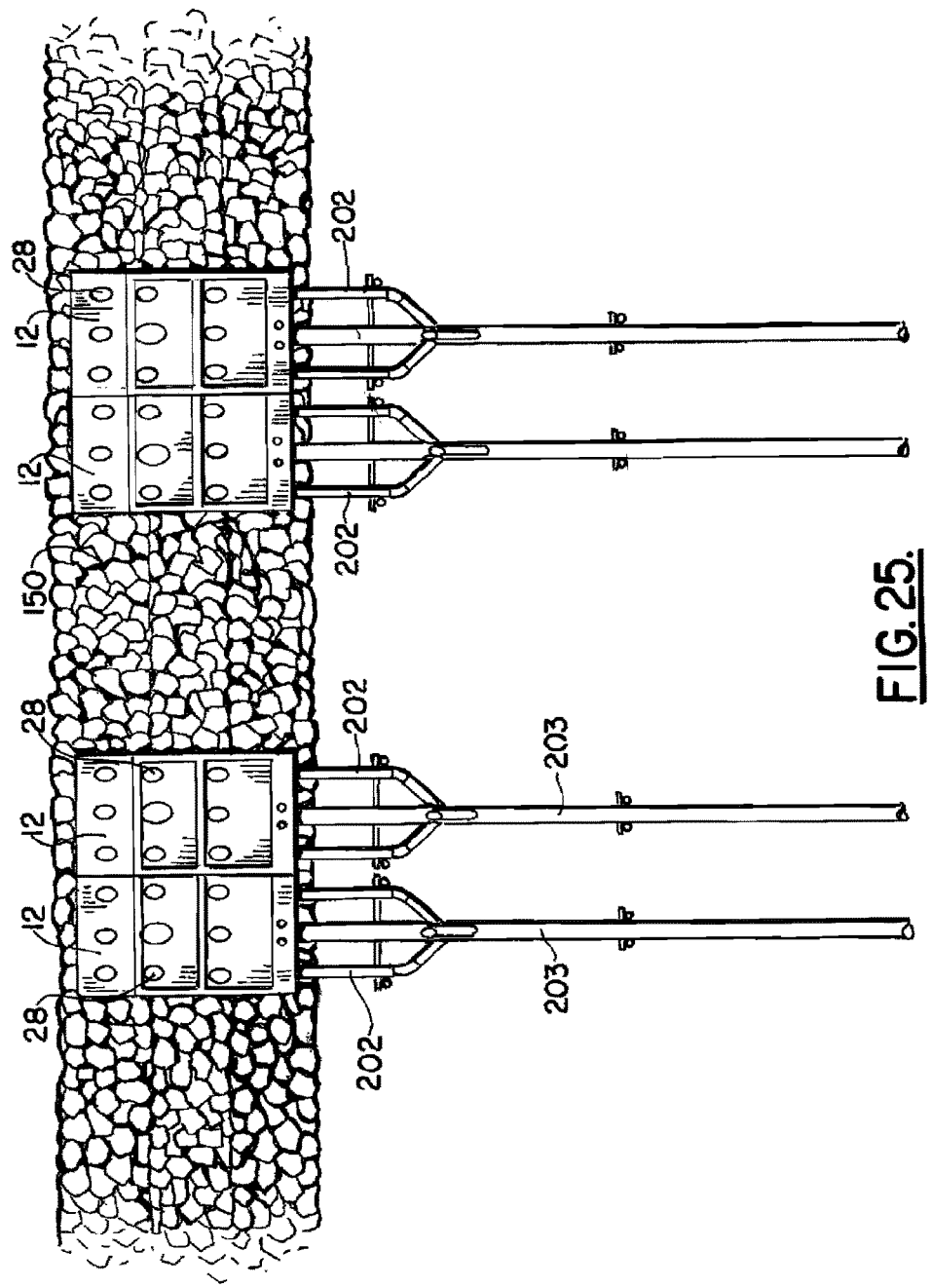
FIG. 25 illustrates a second embodiment of the WSSC System as it would be installed within a rock jetty.
Figure 26:
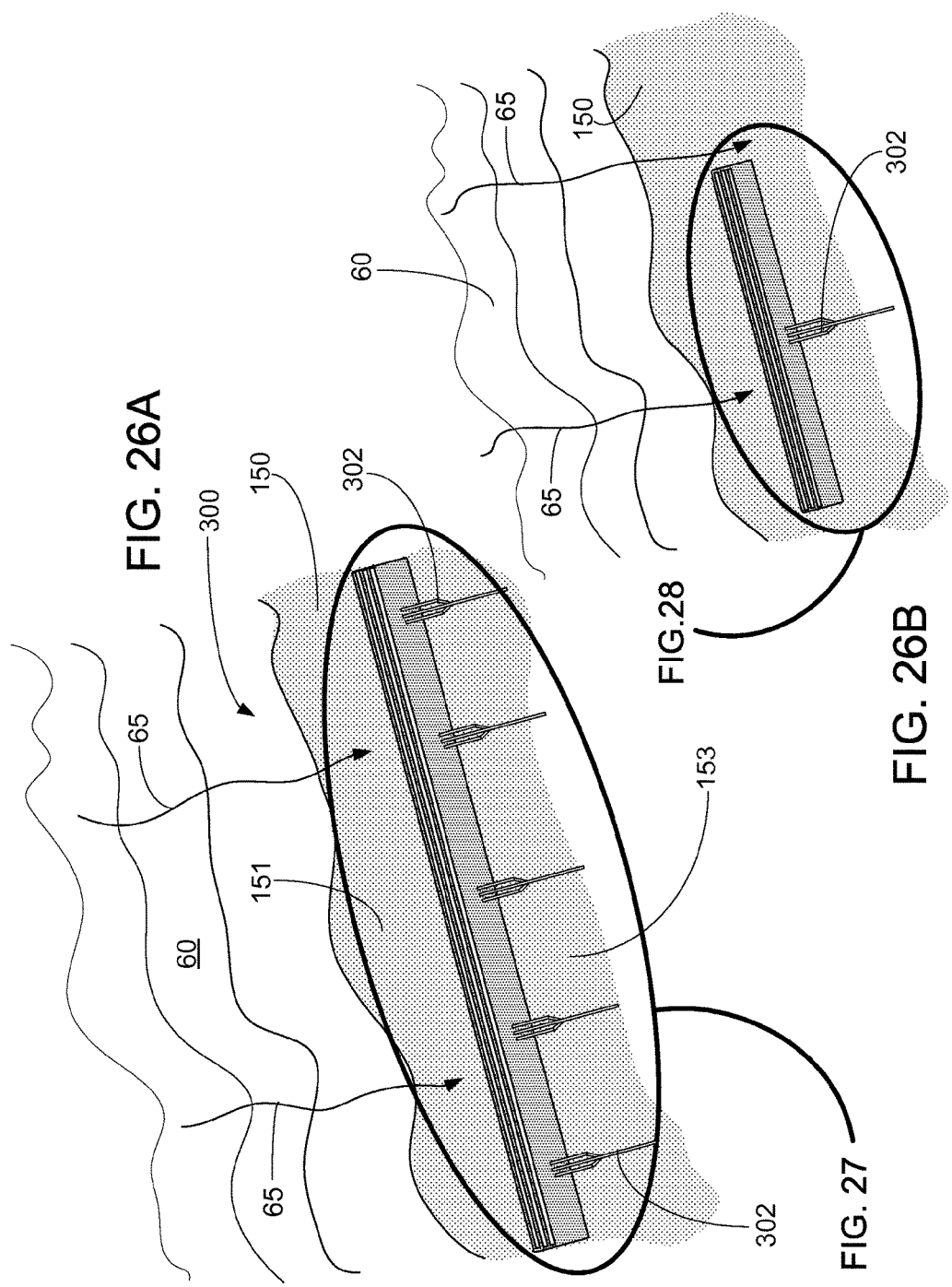
FIGS. 26A and 26B illustrate overall top views yet an additional embodiment of the WSSC System as it would be installed within a rock jetty.

Although FIGS. 18 through 24 illustrate a preferred embodiment for establishing the WSSC System through a rock jetty 150, it is foreseen that the WSSC System 10 as described in FIGS. 1 through 17 could be placed within a rock jetty 150, as seen in FIG. 25. When the system 10 is placed within a rock jetty it may be required that the system is anchored in place so that the strong storm currents won't dislodge the units. An additional shoulder/shelf 36 could be used in this configuration because it would not cause a backwash below the base of the rock jetty. The base of the rock jetty protrudes beyond the base of the unit preventing the backwash from developing. Rather than the water 32 entering the trough 208, there would be provided a plurality of sections 12, as previously described, for receiving the water 32 and sediment 34 into flow pipes 28, and the rear end of each section 12, rather than having a valve 40, the water 32 carrying sediment 34 would flow into flow pipes 202, which would then flow into principal pipe 203, and the system would operate in the manner as described in FIGS. 18 through 24. Although FIG. 25 illustrates the units set up in pairs which are spaced apart, it is foreseen that a plurality of two or more units in a group could be set along the rock jetty.

In the principal embodiment of the system 10, as described in FIGS. 1 through 17, it is foreseen that each section is constructed of a buoyant type material, such as rubber from old tires; that each section would be approximately 12 feet (3.7 m) long and 12 feet (3.7 m) wide, with the rear wall approximately 6 feet (1.8 m) at its highest point, and the front wall angulated to be around 13.5 feet (4.11 m) in length. The pipes would be preferably PVC material, and would be around 1 foot (0.3 m) in diameter.

Reference is now made to FIGS. 26A-33C, which illustrate the second embodiment of the WSSC System as it would be installed through a rock jetty 150 and will be illustrated as WSSC System 300.

Figure 27:
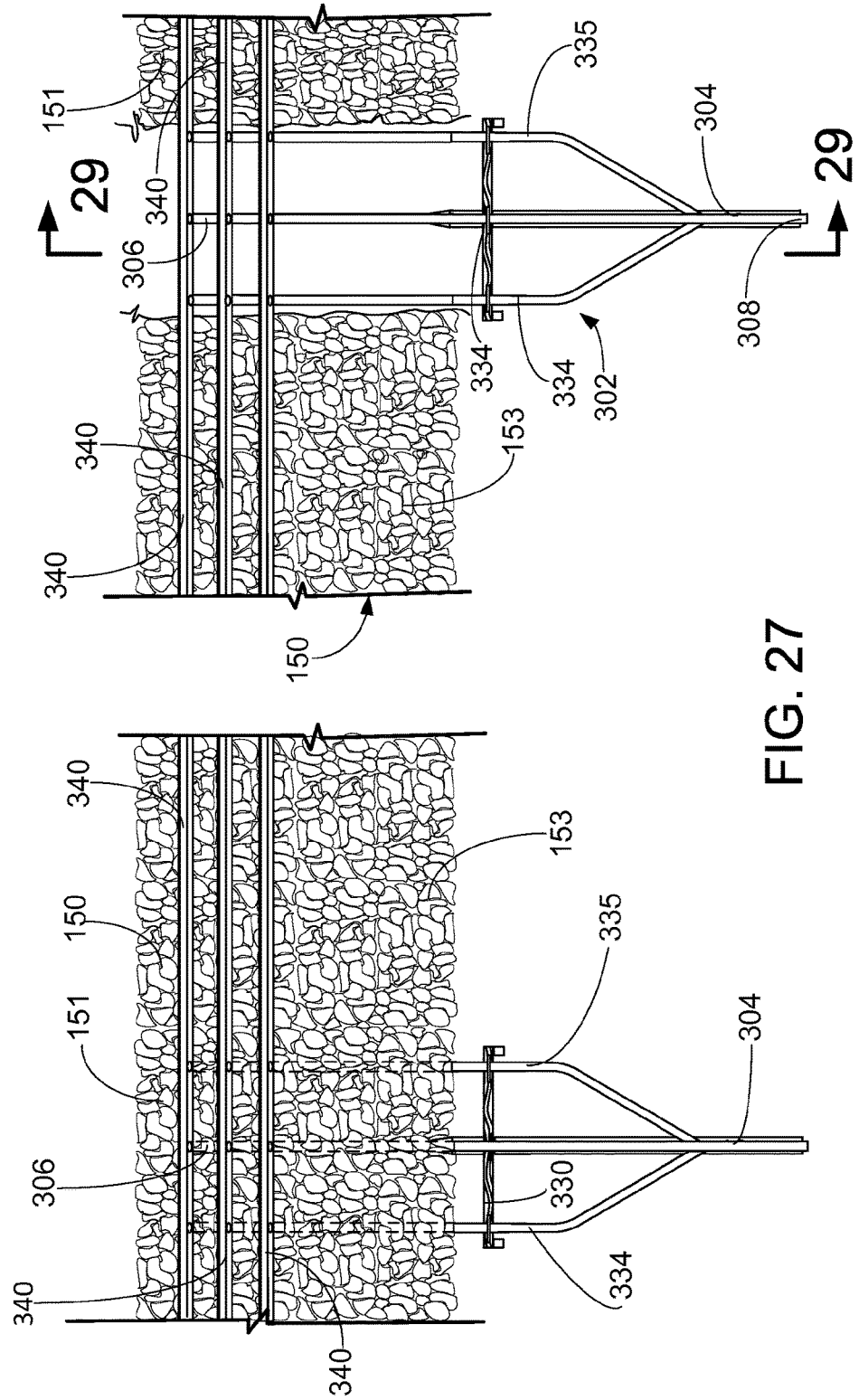
FIG. 27 illustrates isolated top views of two components of the WSSC System as illustrated in FIG. 26A.

Turning now to FIGS. 26A and 26B, there is illustrated a body of water 60 having a current illustrated by arrows 65, flowing towards a rock jetty 150 as illustrated. In FIG. 27 there is a plurality of sediment collection components 302, which will be described below, positioned through the rock jetty 150 for the reasons as will be described further. As illustrated more clearly in FIG. 27, there is provided a single sediment collection component 302, extending through a rock jetty 150. The principal function of each of the components 302 is to receive water and sediment through the component 302 from the unprotected side 151 of the jetty 150 to the protected side 153 of the jetty 150 in order to enable sediment to be carried through the components 302 from the unprotected side 151 of the jetty 150, to the protected side 153, so that the sediment can form dry land up on the protected side 153 of the jetty 150. As illustrated in top view in FIG. 27, the component 302 includes the principal flow pipe 304 having a first sediment receiving end 306 extending out of the unprotected side 151 of the jetty 150, and a second outflow point 308 extending a distance outward from the protected side 153 of the jetty 150.

Figure 28:
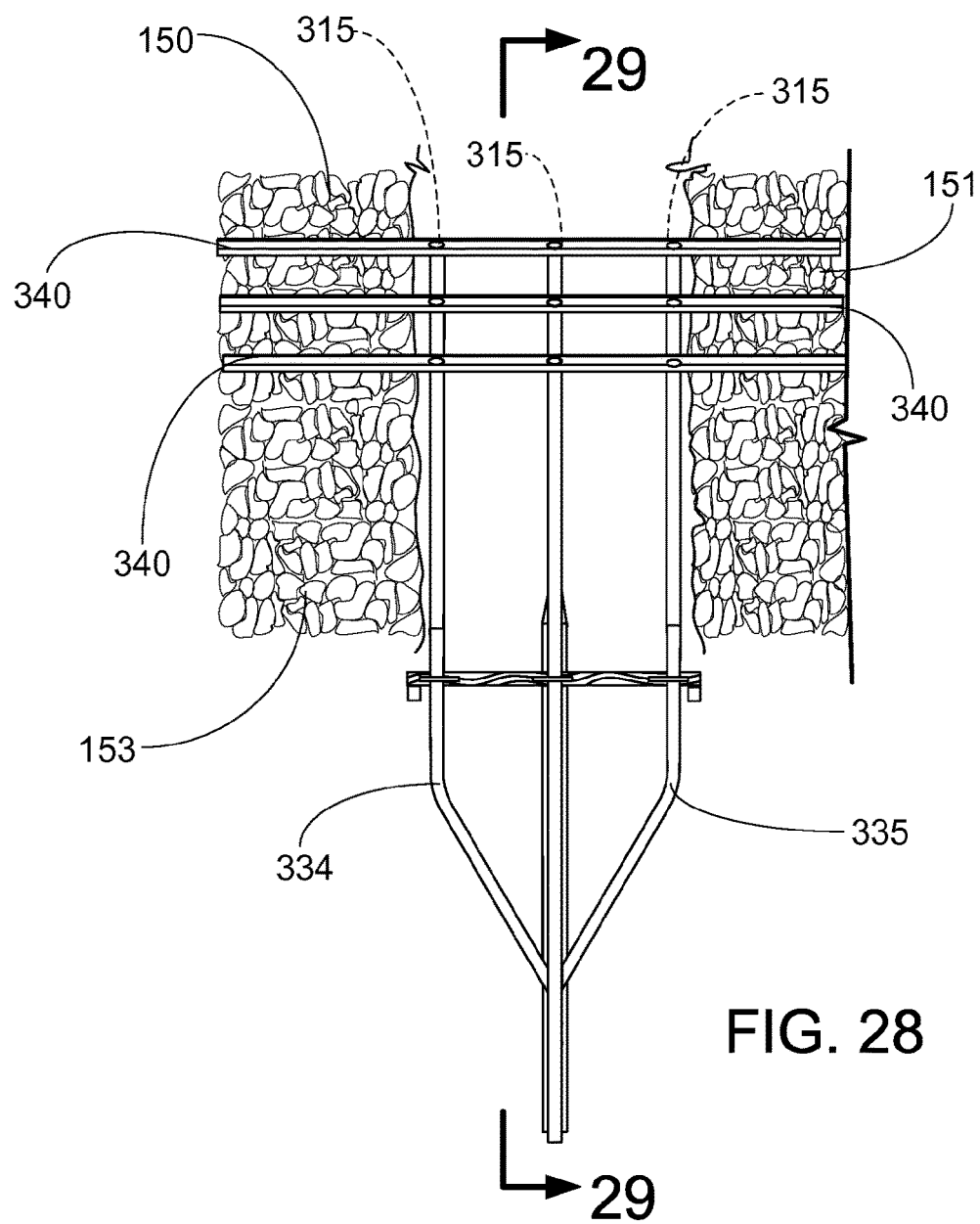
FIG. 28 illustrates an isolated top view of a single component of the WSSC System of the present invention as illustrated in FIG. 26B.

It should be known that FIGS. 27 and 28 should be viewed in conjunction with FIG. 29 which illustrates a side view of the component 302. In the side view, it is noted that the principal flow pipe 304 has an upper sediment receiving pipe 310 with a first end 312 extending from the unprotected side 151 of the jetty 150, and extending through the rock jetty 150 and terminating at a second end 314, which connects into the wall of the principal flow pipe 304 on the protected side 153 of the jetty 150. Additionally, as seen in FIG. 29, there is seen a lower level pipe 316 with a first end 317 extending into the jetty 150 and terminating at a second end 318 a distance from the protected side 153 of the jetty 150. It should be noted that lower pipe 316 does not flow into principal flow pipe 304, since to do so would be flowing against gravity, which is not beneficial. The principal flow pipe 304, upper flow pipe 310 and lower flow pipe 316, as illustrated, are all supported on the protected side 153 of the jetty 150 by a support structure 330, so that the pipes are maintained at a slight angle extending from the sediment collection points on the unprotected side 151 of the jetty 150 downward at an angle to the protected side 153 of the jetty 150, so that the sediment and water collects through the various collection pipes and is deposited at an outflow point 308 of the collection pipe system 300.

Turning now to FIG. 30, there is illustrated a top view of the component 302 which includes a pair of side collection pipes 334, 335, extending from the unprotected side 151 of the jetty 150 at the same level as the principal flow pipe 304, and flowing into the principal flow pipe 304 at a point past the protected side 153 of the jetty, so that as illustrated, only the principal flow pipe 304 deposits the sediment 400 at the outflow point 308, together with the lower flow pipe 316, as explained earlier. Also illustrated in FIG. 30 is a feature which allows sediment to be deposited on either side of the end of principal flow pipe 304. This feature would include a swivel 404 at the end of principal flow pipe 304 which would engage an additional length of principal flow pipe 304, and as seen in phantom view, the length of principal flow pipe 304 past the swivel point 404 would be able to swivel left and right from the principal flow pipe 304 to deposit sediment 400 in other areas. It is further foreseen that as long as the system is in place in jetty 150, in theory, the principal flow pipe 304 could continue to deposit sediment on a continuing basis, so that any excess sediment could be moved to different areas needing sediment.

An interesting facet of this embodiment of the collection system 300 is the means in which the sediment and water is allowed to flow into the various pipes 304, 310, 316, 334 and 335 of each component 302. As seen in FIGS. 31-33C, the upper collection pipe 310 terminates with an upper opening 315 on the unprotected side 151 of the jetty 150, principal flow pipe 304 and side pipes 334, 335 terminate at openings at a lower point outside the jetty 150, and the lower collection pipe 316 terminates at the lowest point outside the jetty 150, all in order to collect the sediment 400 being carried by water (see also FIG. 28 showing openings 315). At each of these three levels of pipe openings 315 of the collection pipes, there is provided a sediment collection component, which will be defined as a collection trough 340, which would be a continuous trough along the length of the jetty where the collection system 300 is placed. Each trough 340, as seen in side view in FIGS. 31 and 32A and 32B, would comprise a flat surface 343, secured into the rock jetty 150 via mounting pins 344 driven into the face of the jetty 150. There is provided a triangular trough portion 340 having a face secured to the jetty 150, and lower support wall 345 extending upward at an angle, and supporting the floor 347 of the trough 340, with the floor 347 angulated toward the opening 315 in each collection pipe so that water and sediment 400 flowing in the direction of arrow 350 would engage the floor portion 347 of the trough 340, and would force gravity flow into the pipe opening 315 in the direction of arrows 350. Further, there is provided an upper filter screen 354 which extends throughout the length of the collection system trough 340, so that any large debris or any rocks falling off the rock jetty would not fall into the collection area 357 of the trough 340 which collects the water and sediment for flowing into the various pipes. Therefore, this would provide a means for preventing any clogging up of the trough 340 into which the water and sediment is collected during the collection process. As a point of information, in FIG. 31 there is illustrated the normal water line 500. The lower most trough 340 would be positioned below the water line 500 and the two upper troughs 340 would be positioned above the water line 500, which would result in the troughs 340 collecting sediment 400 above the normal water line due to the wave action of the body of water. The water line 500 is also seen in FIG. 29 where there is illustrated also a depiction of a wave 502 which is above the water line 500 and will deposit sediment in the upper troughs 340, those above the water line 500.

Figure 34:
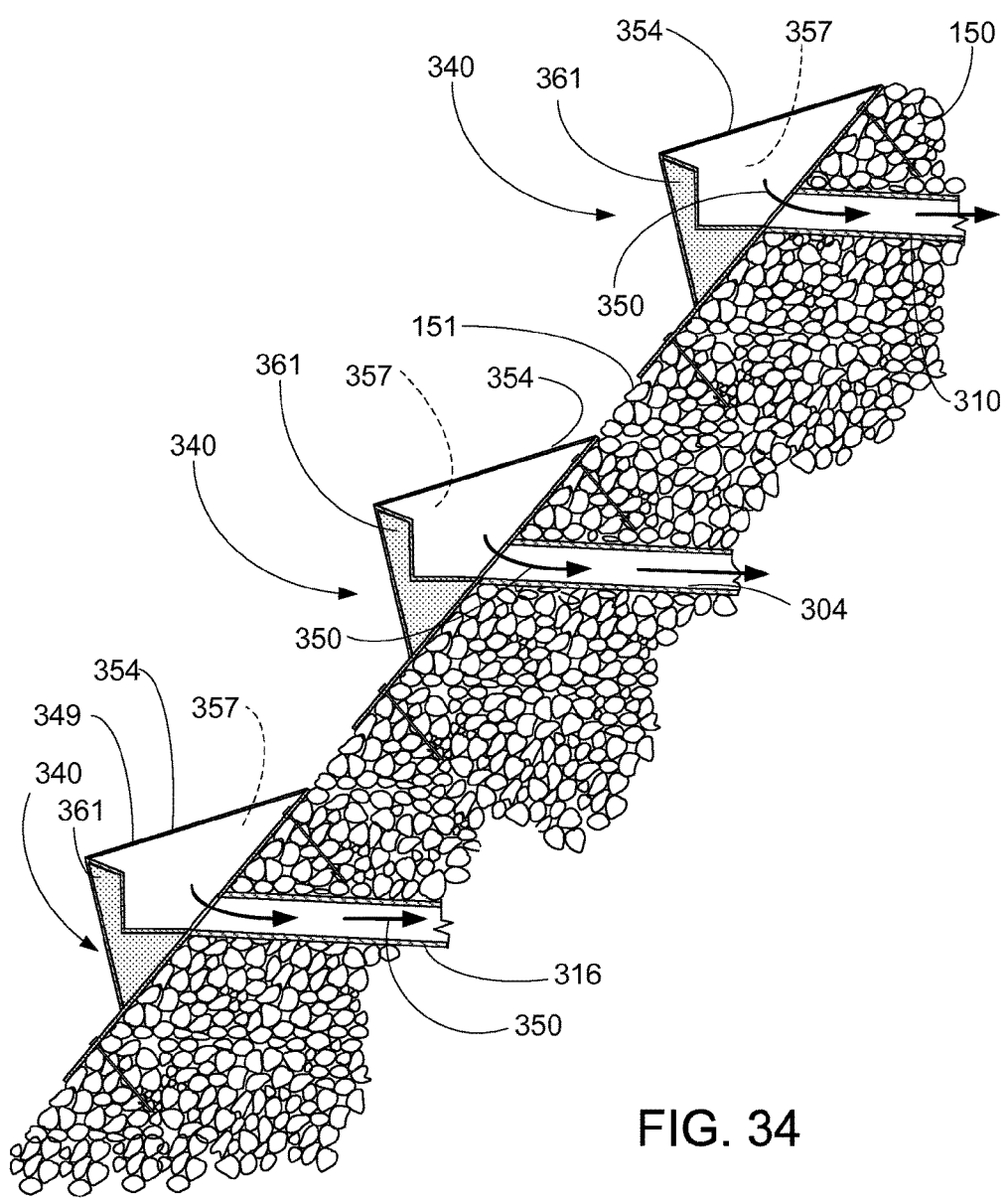
FIG. 34 illustrates a cross-section view of the multiple layers of collection pipes in a collection component of the WSSC System and a second embodiment of the construction of the continuous trough for receiving the flow of water and sediment into the collection component.

Turning now to FIG. 34, there is seen an additional embodiment of the collection trough 340 as we discussed earlier in regard to FIGS. 31-33C. In this particular embodiment, there is provided the lower floor portion 347 as an extension of the collection pipes, and not at an angle as seen in FIGS. 32A and 32B. The floor 347 would terminate at an upright wall 348, that would terminate at an angulated upper shelf 349, with the outer support wall 345 extending down to the flat surface 343 secured to the jetty 150. This trough 340 configuration, like the embodiment seen in the FIGS. 32A and 32B, would also have the filter screen 354 extending from the face of the jetty 150 to the upper shelf 349, so that water and sediment would flow through the screen 354 and would be collected first on the floor portion 347 and would then flow into the pipe openings 315. Therefore, it is foreseen that this would enable greater flow with the water and sediment into the pipes in this particular embodiment.

The embodiment described in FIG. 34, is seen clearly in FIGS. 35A and 35B, except that in FIG. 35B, there is no protective screen 354, but there is an open flow area 357 into the various collection pipes, as opposed to FIG. 35B which shows that there is in fact a protective screen 354 for preventing large rocks and other debris from flowing into the area 357.

Figure 31:
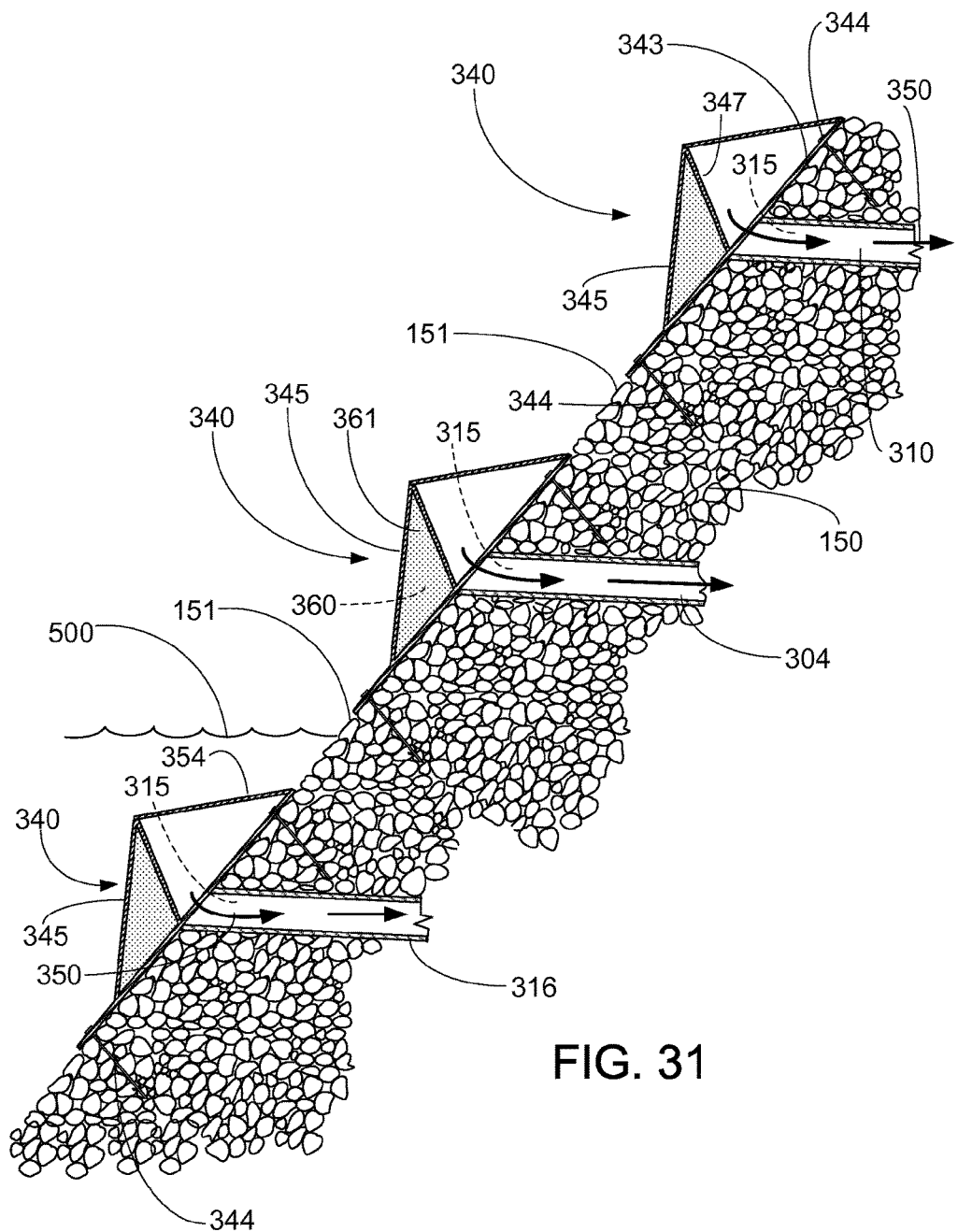
FIG. 31 illustrates a cross-section view of the multiple layers of collection pipes in a collection component of the WSSC System and a first embodiment of the construction of the continuous trough for receiving the flow of water and sediment into the collection component.

For purposes of construction, as seen more clearly in FIGS. 31, 32A and 32B, the area 360 formed by the outer wall 345 and floor 347 in both embodiments of trough 340 would be filled with water 361, for example, in order to give the troughs more weight against being dislodged from the wall of the jetty 150 in the event of a storm, for example.

FIG. 36A represents a longitudinal view of the embodiment shown in FIG. 35A with no collection screen 354 in place, while FIGS. 36B and 36C illustrate longitudinal views of the embodiment of the collection trough 340, as illustrated in 35B with the protective screen 354 in place.

The following is a list of parts and materials suitable for use in the present invention.

PARTS LIST

| Part Number | Description |
| --- | --- |
| 10 | WSSC System |
| 11 | end |
| 12 | section |
| 14 | base |
| 15 | shoreline |
| 16 | sea floor |
| 17 | upper part |
| 18, 20 | side walls |
| 22 | rear wall |
| 24 | top wall |
| 26 | interior space |
| 28 | tubular members |
| 30 | rows |
| 31 | flow bore |
| 32 | water |
| 34 | sediment |
| 35 | rear opening |
| 36 | shoulder/shelf |
| 37 | space |
| 39 | arrows |
| 40 | flapper valve |
| 42 | valving member |
| 44 | inlet valve |
| 46 | outlet valve |
| 50 | barge |
| 52 | cable |
| 54 | boat |
| 60 | body of water |
| 61 | open sea |
| 62 | flow line |
| 63 | arrows |
| 64 | flow opening |
| 65 | arrows |
| 66 | weir |
| 68 | anchor loop |
| 70 | bottom edge |
| 72 | top anchor portion |
| 74 | elongated anchoring member |
| 80 | wave |
| 84 | area |
| 90 | barge |
| 92 | windmill |
| 96 | solar panel |
| 98 | air line |
| 99 | air compressor |
| 100 | storage tank |
| 102 | net |
| 104 | buoy |
| 112 | section |
| 113 | step |
| 117 | floor |
| 119 | entry |
| 121 | arrow |
| 123 | area |
| 130 | pipe |
| 132 | end |
| 150 | rock jetty |
| 151 | unprotected side |
| 152 | base |
| 153 | protected side |
| 154 | exit pipe |
| 156 | forward point |
| 158 | rear point |
| 200 | WSSC System |
| 202 | elongated pipes |
| 203 | principal flow pipe |
| 205 | pilings |
| 206 | rear end |
| 208 | trough |
| 210 | rear wall |
| 212 | angulated floor |
| 214 | side walls |
| 215 | point |
| 216 | entrance |
| 300 | WSSC system |
| 302 | collection component |
| 304 | principal flow pipe |

-continued

PARTS LIST

| Part Number | Description |
| --- | --- |
| 306 | sediment receiving end |
| 308 | outflow point |
| 310 | upper sediment receiving pipe |
| 312 | first end |
| 314 | second end |
| 315 | opening |
| 316 | lower sediment receiving pipe |
| 317 | first end |
| 318 | second end |
| 330 | support structure |
| 334, 335 | side collection pipes |
| 340 | collection trough |
| 343 | flat surface |
| 344 | mounting pins |
| 345 | lower support wall |
| 347 | floor |
| 348 | upright wall |
| 349 | upper shelf |
| 350 | arrows |
| 354 | filter screen |
| 357 | collection area |
| 360 | area |
| 361 | water |
| 400 | sediment |
| 402 | arrow |
| 403 | dry land |
| 404 | swivel |
| 500 | water line |
| 502 | wave |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:
1. A method to provide water and sediment flow through a dam or a water barrier, comprising the following steps:
a) positioning a flow pipe through a body of the dam or water barrier to receive water carrying sediment and flow to a rear of the dam or water barrier, wherein the flow pipe has an entrance proximate to a forward wall of the dam or water barrier, extends between the forward wall and a rear of the dam or water barrier, and extends a desired distance to the rear of the dam or water barrier;
b) positioning a trough at or near the entrance of the flow pipe, so that the trough extends out from the forward wall and is operable to capture the water carrying sediment at the entrance and to facilitate flow of the water carrying sediment through the flow pipe, wherein the trough is positioned to shear a wave and to disperse wave energy contacting the forward wall, while redirecting and using the wave energy to direct the water carrying sediment and flow into the flow pipe and for collecting sediment that is not carried into the flow pipe and settles on the trough for being contacted by a following wave to flow water carrying sediment into the flow pipe;
c) flowing the water and sediment from the flow pipe to the desired distance to the rear of the dam or water barrier; and
d) allowing the water and sediment to exit the flow pipe and be deposited.

2. The method of claim 1 wherein the flow pipe of step "a" is a first flow pipe and further comprising positioning a second flow pipe through the dam or water barrier, the second flow pipe in fluid communication with the first flow pipe, and further comprising flowing water carrying sediment from the second flow pipe to the first flow pipe so that the first flow pipe can flow water carrying sediment received from the second flow pipe to the desired distance to the rear of the dam or water barrier.

3. The method in claim 2, further comprising a filter screen covering an entrance of the trough to allow water and sediment to flow into the trough and to prevent large rocks and other debris from entering the trough.

4. A system to provide water and sediment flow through a dam or barrier, comprising:
a) a principal flow pipe positioned through a body of the dam or barrier to receive water carrying sediment through a first end of the principal flow pipe;
b) wherein the principal flow pipe is operable to flow the water carrying sediment to a rear of the dam or barrier; and
c) a trough positioned on and extending out from a water side of the dam or barrier at or below the first end of the principal flow pipe, the trough operable to shear or break a wave and disperse some wave energy contacting the water side of the barrier and to redirect and use the wave energy to direct sediment to flow into the principal flow pipe to flow the sediment to the rear of the dam or barrier.

5. The system of claim 4 further comprising one or more additional flow pipes positioned through the dam or barrier.

6. The system of claim 4 further comprising a plurality of flow pipes positioned through the dam or barrier for receiving water carrying sediment, and wherein at least one of the plurality of flow pipes is in communication with the principal flow pipe and operable to flow the water carrying sediment to the principal flow pipe.

7. The system in claim 4 further comprising at least one removable section on the principal flow pipe, the at least one removable section operable to be removed from the principal flow pipe when a desired quantity of sediment has been deposited, wherein removal of the at least one removable section enables additional sediment to be deposited nearer to the dam or barrier.

8. The system in claim 7 wherein the principal flow pipe further comprises two or more removable sections that are removable as desired until the sediment deposited reaches a base of the dam or barrier.

9. The system in claim 8, further comprising a filter screen covering an entrance of the trough to allow water and sediment to flow into the trough and to prevent large rocks and other debris from entering the trough.

10. A method of suppressing wave action against a shoreline and collecting sediment to build up the shoreline, comprising:
a) providing a section having at least one sidewall and having at least one flow pipe extending between a front wall and a rear wall of the section;
b) providing a shelf extending out from the front wall, the shelf positioned for shearing a wave and dispersing wave energy contacting the front wall, while redirecting and using the wave energy to direct water and sediment flow into the at least one flow pipe and for collecting sediment that is not carried into the at least one flow pipe and settles on the shelf for being contacted by a following wave to carry the sediment into the at least one flow pipe;

c) flowing the water and sediment from the at least one flow pipe into a principal flow pipe that extends a desired distance to a rear of the section; and d) allowing the water and sediment to exit the principal flow pipe and be deposited.

11. The method of claim 10 wherein the section is incorporated into a dam or barrier.

12. The method of claim 11 further comprising a plurality of sections.

13. The method of claim 12 wherein the plurality of sections are each incorporated into the dam or barrier.

14. The method in claim 13, wherein the plurality of sections each include at least one principal flow pipe in fluid communication with another flow pipe.

15. The method in claim 14 wherein the plurality of sections are spaced apart in intervals along the dam or barrier.

16. The method in claim 15, further including an anchoring system for anchoring each of the plurality of sections to a base of the dam or barrier.

17. A system for suppressing wave action against a shoreline and for collecting sediment to build up the shoreline, comprising:

a) a section having at least one sidewall, and a first flow pipe extending between a front wall and a rear wall of the section;

b) a principal flow pipe extending a desired distance to a rear of the section, wherein the first flow pipe and principal flow pipe are in fluid communication with one another and the first flow pipe is operable to flow fluid and sediment to the principal flow pipe, which flows the fluid and sediment to the desired distance to the rear of the section; and c) providing a shelf extending out from the front wall, the shelf positioned for shearing a wave and dispersing wave energy contacting the front wall, while redirecting and using the wave energy to direct sediment flow into the first flow pipe and for collecting sediment that is not carried into the first flow pipe and settles on the shelf for being contacted by a following wave to carry the sediment into the first flow pipe.

18. The system in claim 17, further comprising a plurality of flow pipes in addition to the first flow pipe, wherein at least one of the plurality of flow pipes and the first flow pipe, are in fluid communication with the principal flow pipe and wherein the plurality of flow pipes are positioned at multiple heights or levels through the section.

19. The system of claim 18 wherein the principal flow pipe is an extension of one of the plurality of flow pipes.

\* \* \* \* \*